(12) United States Patent \
Raghavan et al.

(10) Patent No.: US 12,537,573 B2 \
(45) Date of Patent: Jan. 27, 2026

(54) BEAM MANAGEMENT AND FREQUENCY RANGE LIMITATION ACCORDING TO ANTENNA MODULE CAPABILITIES

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 18/145,549

(22) Filed: Dec. 22, 2022

(65) Prior Publication Data

US 2024/0214043 A1 Jun. 27, 2024

(51) Int. Cl.
*H04B 7/00* (2006.01)
*H04B 7/06* (2006.01)
*H04W 8/24* (2009.01)

(52) U.S. Cl.
CPC ............ *H04B 7/0617* (2013.01); *H04W 8/24* (2013.01)

(58) Field of Classification Search
CPC .. H04B 7/0617; H04B 7/0628; H04B 7/0695; H04B 7/088; H04W 8/24
See application file for complete search history.

(56) References Cited

U.S. PATENT DOCUMENTS

| | | | |
|---|---|---|---|
| 2015/0351135 A1* | 12/2015 | Schmidt ................ | H04W 52/38 455/450 |
| 2021/0160850 A1* | 5/2021 | Akkarakaran ........ | H04W 76/14 |
| 2022/0191673 A1 | 6/2022 | Dutta et al. | |
| 2022/0232479 A1* | 7/2022 | Selma .................. | H04W 52/146 |
| 2023/0180264 A1* | 6/2023 | Kim ...................... | H04B 7/0695 455/414.1 |
| 2023/0189019 A1* | 6/2023 | Park .................... | H04B 7/06952 370/329 |
| 2024/0187844 A1* | 6/2024 | Hong ................. | H04W 72/0453 |
| 2024/0214043 A1* | 6/2024 | Raghavan ............... | H04W 8/24 |
| 2025/0023613 A1 | 1/2025 | Guo et al. | |

* cited by examiner

*Primary Examiner* — Md K Talukder \
(74) *Attorney, Agent, or Firm* — Guang Y. Zhang; Holland & Hart LLP

(57) ABSTRACT

Methods, systems, and devices for wireless communications are described. A user equipment (UE) may transmit a capability message that indicates an antenna module configuration, the antenna module configuration indicating an antenna module format of the UE. The UE may perform a beam management procedure according to a beam management mode associated with a frequency range and corresponding to the antenna module format and may receive, based on the beam management procedure, an indication of a set of parameters for communications using the frequency range. The UE may communicate, based on the set of parameters, one or more messages using the frequency range and one or more antenna modules. Additionally, or alternatively, the UE may receive an indication of a resource allocation for a beam weighting procedure, the resource allocation corresponding to the antenna module format of the UE and may perform the beam weighting procedure using the resource allocation.

26 Claims, 21 Drawing Sheets

BEAM MANAGEMENT AND FREQUENCY RANGE LIMITATION ACCORDING TO ANTENNA MODULE CAPABILITIES

FIELD OF TECHNOLOGY

The following relates to wireless communications, including beam management and frequency range limitation according to antenna module capabilities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support beam management and frequency range limitation according to antenna module capabilities. For example, the described techniques provide for user equipment (UE) capability and antenna module configuration signaling. In some examples, wireless communications systems may support communications in millimeter wave (mmW) frequency ranges allocated to some types of wireless communications (e.g., fifth generation (5G) communications and beyond). In some such implementations, UEs may be designed with multiple (e.g., 2, 3, or more) antenna modules (e.g., each corresponding to a radio frequency integrated circuit (RFIC)) to communicate in these frequency ranges. However, antenna modules may be costly and some original equipment manufacturers (OEMs) may determine to implement solutions utilizing fewer antenna modules.

Wireless devices operating in some wireless communications systems may be subject to various operating standards which define parameters a UE satisfies to communicate in the system. Fewer antenna modules (e.g., two or one) may be able to satisfy operating standards for wireless communications (e.g., 5G communications and beyond) but may experience performance losses in the mmW frequency range. A single L-shaped antenna module (e.g., corresponding to a singular RFIC) may mitigate losses by improving (e.g., doubling) directional communication range (e.g., when compared to a single-sided antenna module) while maintaining lower costs by reducing RFIC quantities. A UE operating with a single L-shaped antenna module may have different capabilities than other UEs and may thus perform more efficiently using different communication configurations or parameters. For example, a UE configured with an L-shaped antenna module may perform various beamforming procedures differently or with differing parameters than a UE configured with antenna modules limited to linear or planar arrays.

A method for wireless communications is described. The method may include transmitting a capability message that indicates an antenna module configuration of the UE, the antenna module configuration indicating an antenna module format for one or more antenna modules of the UE, performing a beam management procedure in accordance with a beam management mode of a set of multiple beam management modes, where the beam management mode is associated with a frequency range and corresponds to the antenna module format for the one or more antenna modules of the UE, receiving, based on the beam management procedure, an indication of a set of communication parameters for communications using the frequency range, and communicating, based on the set of communication parameters, one or more messages using the frequency range and the one or more antenna modules of the UE.

An apparatus for wireless communications is described. The apparatus may include a processor, memory coupled with the processor, and instructions stored in the memory. The instructions may be executable by the processor to cause the apparatus to transmit a capability message that indicates an antenna module configuration of the UE, the antenna module configuration indicating an antenna module format for one or more antenna modules of the UE, perform a beam management procedure in accordance with a beam management mode of a set of multiple beam management modes, where the beam management mode is associated with a frequency range and corresponds to the antenna module format for the one or more antenna modules of the UE, receive, based on the beam management procedure, an indication of a set of communication parameters for communications using the frequency range, and communicating, base at least in part on the set of communication parameters, one or more messages using the frequency range and the one or more antenna modules of the UE.

Another apparatus for wireless communications is described. The apparatus may include means for transmitting a capability message that indicates an antenna module configuration of the UE, the antenna module configuration indicating an antenna module format for one or more antenna modules of the UE, means for performing a beam management procedure in accordance with a beam management mode of a set of multiple beam management modes, where the beam management mode is associated with a frequency range and corresponds to the antenna module format for the one or more antenna modules of the UE, means for receiving, based on the beam management procedure, an indication of a set of communication parameters for communications using the frequency range, and means for communicating, based on the set of communication parameters, one or more messages using the frequency range and the one or more antenna modules of the UE.

A non-transitory computer-readable medium storing code for wireless communications is described. The code may include instructions executable by a processor to transmit a capability message that indicates an antenna module configuration of the UE, the antenna module configuration indicating an antenna module format for one or more antenna modules of the UE, perform a beam management procedure in accordance with a beam management mode of a set of multiple beam management modes, where the beam management mode is associated with a frequency range and corresponds to the antenna module format for the one or more antenna modules of the UE, receive, based on the beam management procedure, an indication of a set of communication parameters for communications using the frequency range, and communicating, base at least in part on the set of communication parameters, one or more messages using the frequency range and the one or more antenna modules of the UE.

In some examples of the method, apparatuses, and non-transitory computer-readable medium described herein, transmitting the capability message may include operations, features, means, or instructions for transmitting an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

In some examples of the method, apparatuses, and non-transitory computer-readable medium described herein, performing the beam management procedure may include operations, features, means, or instructions for performing the beam management procedure in accordance with a common beam management mode associated with a first frequency range that may be smaller than a frequency range capability of the UE.

Some examples of the method, apparatuses, and non-transitory computer-readable medium described herein may further include operations, features, means, or instructions for receiving an indication for the UE to switch from a common beam management mode to an independent beam management mode based on the antenna module configuration.

In some examples of the method, apparatuses, and non-transitory computer-readable medium described herein, performing the beam management procedure may include operations, features, means, or instructions for performing the beam management procedure in accordance with the independent beam management mode, where the independent beam management mode may be associated with a second frequency range that may be larger than the frequency range.

In some examples of the method, apparatuses, and non-transitory computer-readable medium described herein, the frequency range may be based on a beamforming capability of the UE in the frequency range.

In some examples of the method, apparatuses, and non-transitory computer-readable medium described herein, the indication of the set of communication parameters includes a subcarrier spacing for the communications based on the antenna module configuration and the frequency range.

In some examples of the method, apparatuses, and non-transitory computer-readable medium described herein, the indication of the set of communication parameters includes an indication for the UE to use a subset of the frequency range or the frequency range for the communications based on the antenna module configuration and the beam management mode.

In some examples of the method, apparatuses, and non-transitory computer-readable medium described herein, communicating the one or more messages may include operations, features, means, or instructions for communicating, based on the set of communication parameters, the one or more messages using a first set of beam weights corresponding to the subset of the frequency range and communicating, based on the set of communication parameters, the one or more messages using a second set of beam weights corresponding to the frequency range.

In some examples of the method, apparatuses, and non-transitory computer-readable medium described herein, the subset of the frequency range may be indicated based on a carrier frequency offset associated with the subset of the frequency range.

A method for wireless communications is described. The method may include receiving, from a UE, a capability message that indicates an antenna module configuration of the UE, the antenna module configuration indicating an antenna module format for one or more antenna modules of the UE, performing a beam management procedure in accordance with a beam management mode of a set of multiple beam management modes, where the beam management mode is associated with a frequency range and corresponds to the antenna module format for the one or more antenna modules of the UE, and transmitting, based on the beam management procedure, an indication of a set of communication parameters for communications using the frequency range.

An apparatus for wireless communications is described. The apparatus may include a processor, memory coupled with the processor, and instructions stored in the memory. The instructions may be executable by the processor to cause the apparatus to receive, from a UE, a capability message that indicates an antenna module configuration of the UE, the antenna module configuration indicating an antenna module format for one or more antenna modules of the UE, perform a beam management procedure in accordance with a beam management mode of a set of multiple beam management modes, where the beam management mode is associated with a frequency range and corresponds to the antenna module format for the one or more antenna modules of the UE, and transmit, based on the beam management procedure, an indication of a set of communication parameters for communications using the frequency range.

Another apparatus for wireless communications is described. The apparatus may include means for receiving, from a UE, a capability message that indicates an antenna module configuration of the UE, the antenna module configuration indicating an antenna module format for one or more antenna modules of the UE, means for performing a beam management procedure in accordance with a beam management mode of a set of multiple beam management modes, where the beam management mode is associated with a frequency range and corresponds to the antenna module format for the one or more antenna modules of the UE, and means for transmitting, based on the beam management procedure, an indication of a set of communication parameters for communications using the frequency range.

A non-transitory computer-readable medium storing code for wireless communications is described. The code may include instructions executable by a processor to receive, from a UE, a capability message that indicates an antenna module configuration of the UE, the antenna module configuration indicating an antenna module format for one or more antenna modules of the UE, perform a beam management procedure in accordance with a beam management mode of a set of multiple beam management modes, where the beam management mode is associated with a frequency range and corresponds to the antenna module format for the one or more antenna modules of the UE, and transmit, based on the beam management procedure, an indication of a set of communication parameters for communications using the frequency range.

In some examples of the method, apparatuses, and non-transitory computer-readable medium described herein, receiving the capability message may include operations, features, means, or instructions for receiving an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

In some examples of the method, apparatuses, and non-transitory computer-readable medium described herein, performing the beam management procedure may include operations, features, means, or instructions for performing the beam management procedure in accordance with a common beam management mode associated with a first frequency range that may be smaller than a frequency range capability of the UE.

Some examples of the method, apparatuses, and non-transitory computer-readable medium described herein may further include operations, features, means, or instructions for transmitting an indication for the UE to switch from a common beam management mode to an independent beam management mode based on the antenna module configuration.

In some examples of the method, apparatuses, and non-transitory computer-readable medium described herein, performing the beam management procedure may include operations, features, means, or instructions for performing the beam management procedure in accordance with the independent beam management mode, where the independent beam management mode may be associated with a second frequency range that may be larger than the frequency range.

In some examples of the method, apparatuses, and non-transitory computer-readable medium described herein, the frequency range may be based on a beam forming capability of the UE in the frequency range.

In some examples of the method, apparatuses, and non-transitory computer-readable medium described herein, the indication of the set of communication parameters includes a subcarrier spacing for the communications based on the antenna module configuration and the frequency range.

In some examples of the method, apparatuses, and non-transitory computer-readable medium described herein, the indication of the set of communication parameters includes an indication for the UE to use a subset of the frequency range or the frequency range for the communications based on the antenna module configuration and the beam management mode.

In some examples of the method, apparatuses, and non-transitory computer-readable medium described herein, the indication of the set of communication parameters may include operations, features, means, or instructions for a first set of beam weights corresponding to the subset of the frequency range and a second set of beam weights corresponding to the frequency range.

In some examples of the method, apparatuses, and non-transitory computer-readable medium described herein, the subset of the frequency range may be indicated based on a carrier frequency offset associated with the subset of the frequency range.

A method for wireless communications is described. The method may include transmitting a capability message that indicates an antenna module configuration of the UE, the antenna module configuration indicating an antenna module format for one or more antenna modules of the UE, receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure, and performing the beam weighting procedure using the set of allocated resources for a set of antenna elements corresponding to the antenna module format based on the reference signal resource allocation.

An apparatus for wireless communications is described. The apparatus may include a processor, memory coupled with the processor, and instructions stored in the memory. The instructions may be executable by the processor to cause the apparatus to transmit a capability message that indicates an antenna module configuration of the UE, the antenna module configuration indicating an antenna module format for one or more antenna modules of the UE, receive an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure, and perform the beam weighting procedure using the set of allocated resources for a set of antenna elements corresponding to the antenna module format based on the reference signal resource allocation.

Another apparatus for wireless communications is described. The apparatus may include means for transmitting a capability message that indicates an antenna module configuration of the UE, the antenna module configuration indicating an antenna module format for one or more antenna modules of the UE, means for receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure, and means for performing the beam weighting procedure using the set of allocated resources for a set of antenna elements corresponding to the antenna module format based on the reference signal resource allocation.

A non-transitory computer-readable medium storing code for wireless communications is described. The code may include instructions executable by a processor to transmit a capability message that indicates an antenna module configuration of the UE, the antenna module configuration indicating an antenna module format for one or more antenna modules of the UE, receive an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure, and perform the beam weighting procedure using the set of allocated resources for a set of antenna elements corresponding to the antenna module format based on the reference signal resource allocation.

In some examples of the method, apparatuses, and non-transitory computer-readable medium described herein, transmitting the capability message may include operations, features, means, or instructions for transmitting an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

Some examples of the method, apparatuses, and non-transitory computer-readable medium described herein may further include operations, features, means, or instructions for determining a set of beam weights for communications at the UE based on performing the beam weighting procedure.

In some examples of the method, apparatuses, and non-transitory computer-readable medium described herein, receiving the indication of the reference signal resource allocation may include operations, features, means, or instructions for receiving an indication of a subset of reference signal resources of a total set of reference signal resources that may be based on the antenna module configuration of the UE, where the beam weighting procedure may be performed using the subset of reference signal resources.

In some examples of the method, apparatuses, and non-transitory computer-readable medium described herein, the total set of reference signal resources may be a function of a quantity of antenna elements in the antenna module format.

A method for wireless communications is described. The method may include receiving, from a UE, a capability message that indicates an antenna module configuration of the UE, the antenna module configuration indicating an antenna module format for one or more antenna modules of the UE and transmitting an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

An apparatus for wireless communications is described. The apparatus may include a processor, memory coupled with the processor, and instructions stored in the memory. The instructions may be executable by the processor to cause the apparatus to receive, from a UE, a capability message that indicates an antenna module configuration of the UE, the antenna module configuration indicating an antenna module format for one or more antenna modules of the UE and transmit an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

Another apparatus for wireless communications is described. The apparatus may include means for receiving, from a UE, a capability message that indicates an antenna module configuration of the UE, the antenna module configuration indicating an antenna module format for one or more antenna modules of the UE and means for transmitting an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

A non-transitory computer-readable medium storing code for wireless communications is described. The code may include instructions executable by a processor to receive, from a UE, a capability message that indicates an antenna module configuration of the UE, the antenna module configuration indicating an antenna module format for one or more antenna modules of the UE and transmit an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

In some examples of the method, apparatuses, and non-transitory computer-readable medium described herein, receiving the capability message may include operations, features, means, or instructions for receiving an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

In some examples of the method, apparatuses, and non-transitory computer-readable medium described herein, transmitting the indication of the reference signal resource allocation may include operations, features, means, or instructions for transmitting an indication of a subset of reference signal resources of a total set of reference signal resources that may be based on the antenna module configuration of the UE, where the subset of reference signal resources may be for a beam weighting procedure.

In some examples of the method, apparatuses, and non-transitory computer-readable medium described herein, the total set of reference signal resources may be a function of a quantity of antenna elements in the antenna module format.

DETAILED DESCRIPTION

Figure 1:
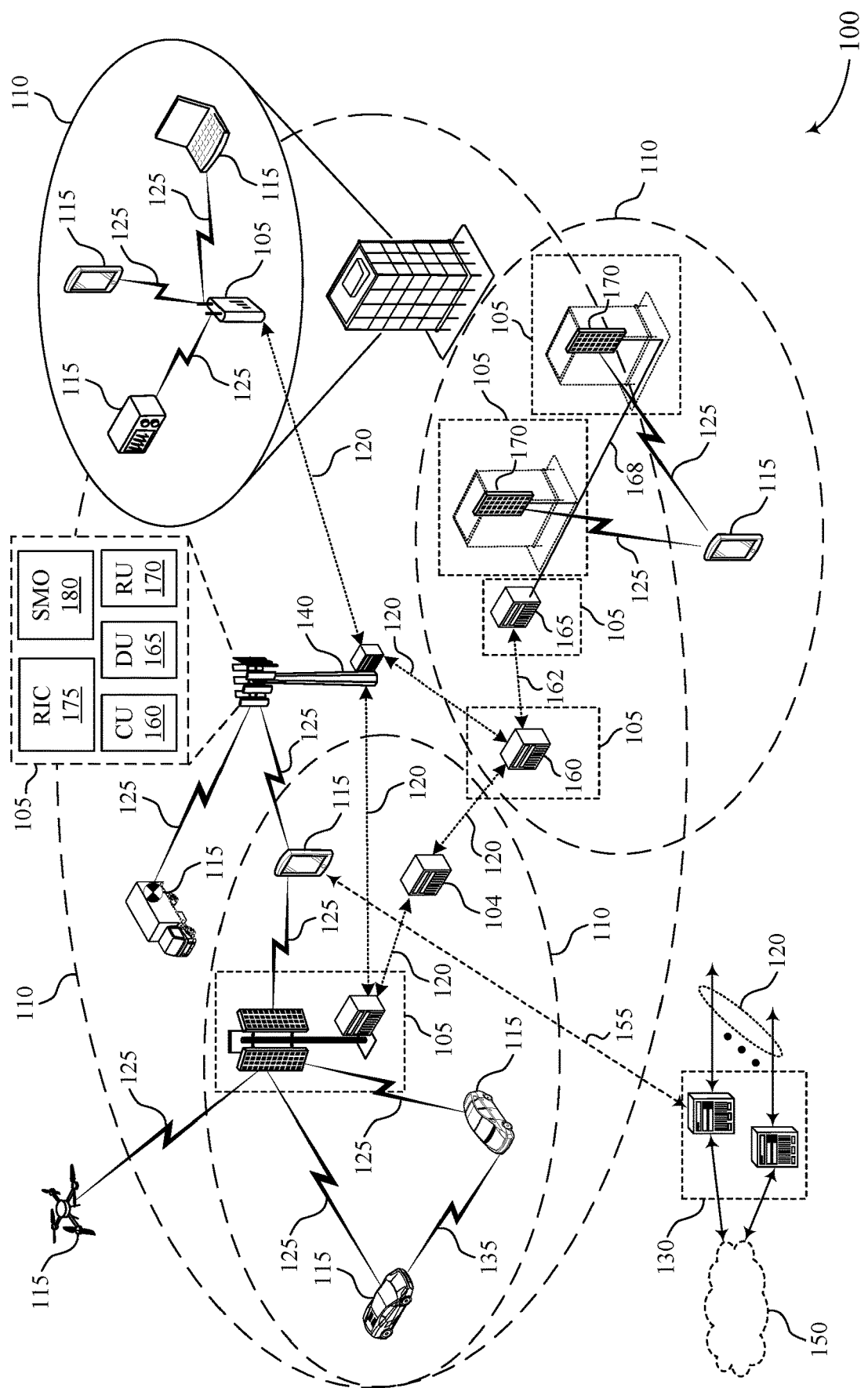
FIG. 1 illustrates an example of a wireless communications system that supports beam management and frequency range limitation according to antenna module capabilities in accordance with one or more aspects of the present disclosure.

Some wireless communications systems may support communications in an expanded (e.g., wide) frequency range (e.g., millimeter wave (mmW), frequency range 2 (FR2)) allocated to some types of wireless communications (e.g., fifth generation (5G) communications and beyond). In some such implementations, user equipment (UEs) may be designed with multiple (e.g., up to three, or more) antenna modules (e.g., each corresponding to a radio frequency integrated circuit (RFIC)) located on various edges or sides of the UE to communicate in these frequency ranges. However, antenna modules may be costly and some original equipment manufacturers (OEMs) may determine to implement solutions utilizing fewer antenna modules.

Wireless devices operating in some wireless communications systems may be subject to various operating standards which define parameters a UE satisfies to communicate in the system. Fewer antenna modules (e.g., two or one) may be able to satisfy the various operating standards for wireless communications (e.g., 5G communications and beyond) but performance losses in some frequency ranges may exceed a target range or threshold loss. A single L-shaped antenna module (e.g., corresponding to a singular RFIC) may mitigate losses while maintaining lower costs. However, a UE operating with a single L-shaped antenna module may have different capabilities than other UEs (e.g., UEs that do not utilize a single L-shaped antenna module) and may thus perform more efficiently using different communication configurations or parameters (e.g., beam configurations, frequency ranges, beam management modes, subcarrier spacing, beam weighting).

In a first example, devices may communicate in the 28 GHz band (27.5-28.35 GHz) using a phase shifter configuration in a common beam management mode. That is, a phase shifter configuration may be determined for a given frequency and then used for other frequencies in the band, which may experience a loss in performance in some bands, which may be exacerbated by an L-shaped antenna module.

Losses in performance at some communication frequencies may be mitigated by narrowing a total frequency bandwidth supported by a device based on the antenna module type of the device in the common beam management mode or by switching an operating mode of the device to an independent beam management mode to enable L-shaped antenna modules to cover wider frequencies or frequency ranges while reducing performance loss. For example, a UE may transmit an indication of a configuration of its antenna modules or an antenna module capability (e.g., to a network entity). Based on the configuration, the network entity may determine the frequency range within which communication at the UE is enabled or may determine to switch the UE to an independent beam management mode for communications in a relatively wider frequency range to avoid performance loss caused by L-shaped antenna modules operating in the wider frequency range using a common beam management mode.

In a second example, performance gains may be realized by combining signals received from each side of an L-shaped antenna module. However, these gains may be limited if a device implements fixed beam weight codebooks for beamformed communications. For example, in the case of an L-shaped antenna module, a gap in performance may exist between a fixed codebook-based approach and a dynamic or an adaptive beam weight approach. However, in some cases, operating using the dynamic codebook-based approach may be an inefficient use of reference signal resources.

A network entity may tailor or configure (e.g., define or set parameters for) a beam-weighting procedure according to the antenna module configuration of a UE based on an indication of the corresponding antenna module configuration or capability. For example, the network entity may adjust a quantity of reference signal resources for determining a beam weighting codebook based on the indicated configuration or capability. This may conserve resources while increasing performance of the UE using the beam weighting of L-shaped antenna modules.

While these examples are described in the context of L-shaped antenna modules, the methods described herein may be applicable to other antenna module configurations whose operations may benefit from additional considerations implemented by a network entity. In other words, while aspects described herein are described with respect to L-shaped antenna modules, the techniques herein may be applicable to any antenna module configuration such as those that include multiple linear or planar antenna arrays served by a single RFIC for which communication performance may be affected by the antenna module configuration.

Aspects of the disclosure are initially described in the context of wireless communications systems. Aspects of the disclosure are further demonstrated in the contest of a wireless device, additional wireless communications system examples, and various process flows. Aspects of the disclosure are further illustrated by and described with reference to apparatus diagrams, system diagrams, and flowcharts that relate to beam management and frequency range limitation according to antenna module capabilities.

FIG. 1 illustrates an example of a wireless communications system 100 that supports beam management and frequency range limitation according to antenna module capabilities in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support beam management and frequency range limitation according to antenna module capabilities as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets or codebooks (e.g., different directional listening weight sets or codebooks) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support wireless devices (e.g., UEs 115) that include multiple antennas or antenna modules communicating in frequency ranges such as millimeter wave frequency ranges. Beamforming using multiple antennas may mitigate potential performance losses affecting link budget in such systems. In some examples, multiple antenna modules or panels (e.g., each corresponding to a RFIC) having a set of antenna elements may be co-phased or stacked for beamforming in these systems where weights for combining antenna elements to form communication beams may be determined based on measuring reference signals. Additionally, the use of multiple antenna modules may enable some devices to satisfy spherical coverage thresholds (e.g., potentially affected by user body blockage) and may support increased robustness when beam switching over antenna modules.

Individual antenna modules may be relatively expensive. As such devices having multiple antenna modules may incur increased manufacturing costs and thus implementations using a single L-shaped antenna module may mitigate costs while maintaining beamforming performance enhancements.

For example, with two sides to a L-shaped antenna module, gains may be realized by polarization combining the sides of an L-shaped antenna module using a beam weight codebook. However, these gains may be more difficult to realize using fixed beam weight codebooks (e.g., codebooks including fixed sets of beam weights for signal combining). Thus, reference signal resource allocation for determining beam weights based on an antenna module configuration of a device may support performance at a wireless device.

In some other examples, wireless device may communicate in some relatively wider frequency ranges using a phase shifter configuration in a common beam management mode. That is, a phase shifter configuration may be determined for a first frequency and then used for remaining frequencies in the band causing a drop in performance in some bands which may be exacerbated by an L-shaped antenna module.

In some examples of the wireless communications system 100, a UE 115 may transmit a capability message that indicates an antenna module configuration, the antenna module configuration indicating an antenna module format of the UE 115. The UE 115 may perform a beam management procedure according to a beam management mode associated with a frequency range and corresponding to the antenna module format and may receive, based on the beam management procedure, an indication of a set of parameters for communications using the frequency range. The UE 115 may communicate, based on the set of parameters, one or more messages using the frequency range and one or more antenna modules.

Additionally, or alternatively, the UE 115 may receive an indication of a resource allocation for a beam weighting procedure, the resource allocation corresponding to the antenna module format of the UE 115 and may perform the beam weighting procedure using the resource allocation. For example, determine a set of beam weights for communications at the UE 115 based on a quantity of reference signal resources allocated to the UE 115 and, in some examples, based on parameters associated with the quantity of reference signal resources.

As such, a network entity 105 communicating with the UE 115 may account for the antenna module capability of the UE 115 when configuring or communicating with the UE 115 using beamformed communications.

Figure 2A:
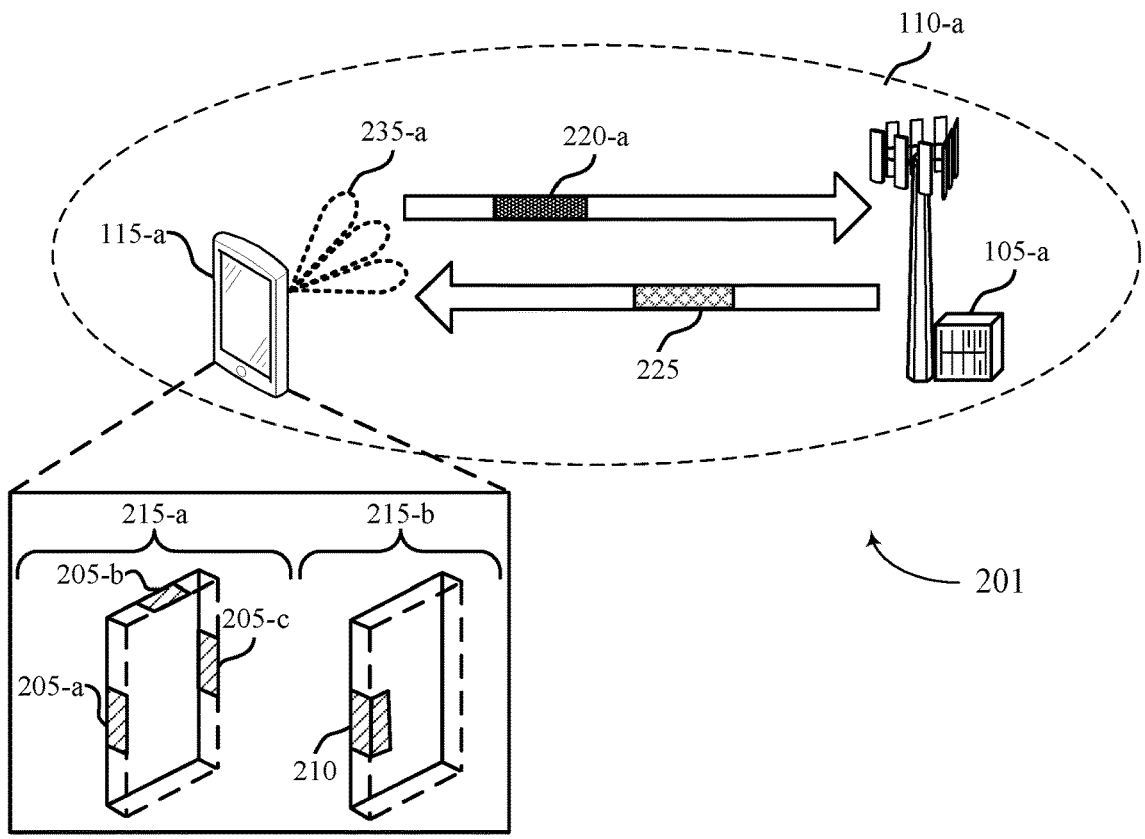
FIGS. 2A & 2B each illustrate an example of a wireless communications system that supports beam management and frequency range limitation according to antenna module capabilities in accordance with one or more aspects of the present disclosure.

FIG. 2A illustrates an example of a wireless communications system 201 that supports beam management and frequency range limitation according to antenna module capabilities in accordance with one or more aspects of the present disclosure. In some examples, the wireless communications system 201 may implement aspects of wireless communications system 100. The wireless communications system 201 may illustrate communications between a network entity 105-a and a UE 115-a in a coverage area 110-a. The network entity 105-a and the UE 115-a may be examples of a network entity 105 and a UE 115 as described with reference to FIG. 1.

The UE 115-a may be associated with an antenna module configuration 215 including a quantity of antenna modules that support a range of coverage (e.g., full spherical coverage). In some examples, the antenna module configuration may include a quantity of antenna modules of the UE 115-a, a dimensionality of a set of antenna elements of the one or more antenna modules 205 or 210 of the UE 115-a, a geometric shape of the one or more antenna modules 205 or 210 of the UE 115-a, a positioning of the one or more antenna modules 205 or 210 relative to the UE 115-a, a location of the one or more antenna modules 205 or 210 relative to the UE 115-a, or any combination thereof. For example, the UE 115-a may be associated or configured with edge antenna module configuration 215-a which may include three planar or linear antenna modules 205 along outer edges of the UE 115-a. In some examples, UE 115-a may include two antenna modules 205-*a* and 205-*c* along opposite long edges of the UE 115-*a*. In some examples, a linear antenna array may include a 5×1 dual-polarized (5 antenna elements in 1 line, row, or column) linear antenna array. Each of the planar or linear antenna modules 205-*a*, 205-*b*, and 205-*c* may include or be coupled with a corresponding RFIC.

In some other examples, the UE 115-*a* may be associated with or configured with an L-shaped antenna module configuration 215-*b* including a quantity of L-shaped antenna modules 210 spanning at least two side of the UE 115-*a* and that may have a different capability or set of performance metrics than linear or planar arrays. For example, an L-shaped antenna module 210 may include a 5×1 dual-polarized linear array on each of its sides, which may join or couple along an edge or corner of the UE 115-*a*). For example, the L-shaped antenna module 210 may include two 5×1 linear arrays (or other linear or planar array configuration) coupled with a single RFIC, where the antenna elements across spanning the two sides may be dynamically combined with adaptive beam weights for the communication beams 235-*a* and adaptive polarization combining.

In some examples, the network entity 105-*a* may narrow the bandwidth covered by the UE 115-*a* based on the antenna module type in a common beam management mode in which adaptive beam weights may be determined for a first frequency range and may be reused across the entire band (e.g., common beam management may be referred to as a "non-optimized" solution from a wideband frequency coverage perspective) or may trigger an independent beam management mode operation for wider bandwidth coverage in which adaptive beam weights are designed for each frequency sample of a frequency range and then this adaptive set of beam weights are used over each frequency sample (e.g., independent beam management may be referred to as an "optimized" solution from a wideband frequency coverage perspective).

Independent beam management may be inefficient (e.g., may be resource intensive) in some use cases (e.g., because a single set of beam weights may be stored in the RFIC), but may provide greater performance gains than common beam management modes in some circumstances. For example, performance losses may be experienced as the same beam weights are sometimes used over various frequency ranges (e.g., 28 GHz, 39 GHz, and 42 GHz bands) in the common beam management mode. Additionally, L-shaped antenna module configuration 215-*b* may incur additional impacts in wider bandwidth coverage implementations than the edge antenna module configuration 215-*a*, for examples, due to supporting fewer pointing or beam directions for directional communications.

For example, different sets of beam weights may be used by the UE 115-*a* for different frequencies within an intended or given bandwidth to be supported for communications. Independent beam management may be associated with different reference signal density for different frequencies and may incur a higher overhead than common beam management. Thus, use of the independent beam management mode of operation may be determined and triggered by the network entity 105-*a* in some circumstances.

Additionally, or alternatively, the network entity 105-*a* may narrow frequency bandwidth coverage based on an indication of antenna module capability in a capability message 220-*a*, where UE 115-*a* may indicate use of a L-shaped antenna module 210. In response, the network entity may transmit communication parameters 225.

In some examples, the communication parameters 225 may indicate a subcarrier spacing based on the antenna module configuration of the UE 115-*a*. The subcarrier spacing may be bandwidth dependent. In some examples, a narrower bandwidth may be covered by the UE 115-*a* based on the antenna module design or capability of the UE 115-*a* to mitigate carrier frequency offset (CFO)-related effects on different parts of the wide bandwidth coverage.

Figure 2B:
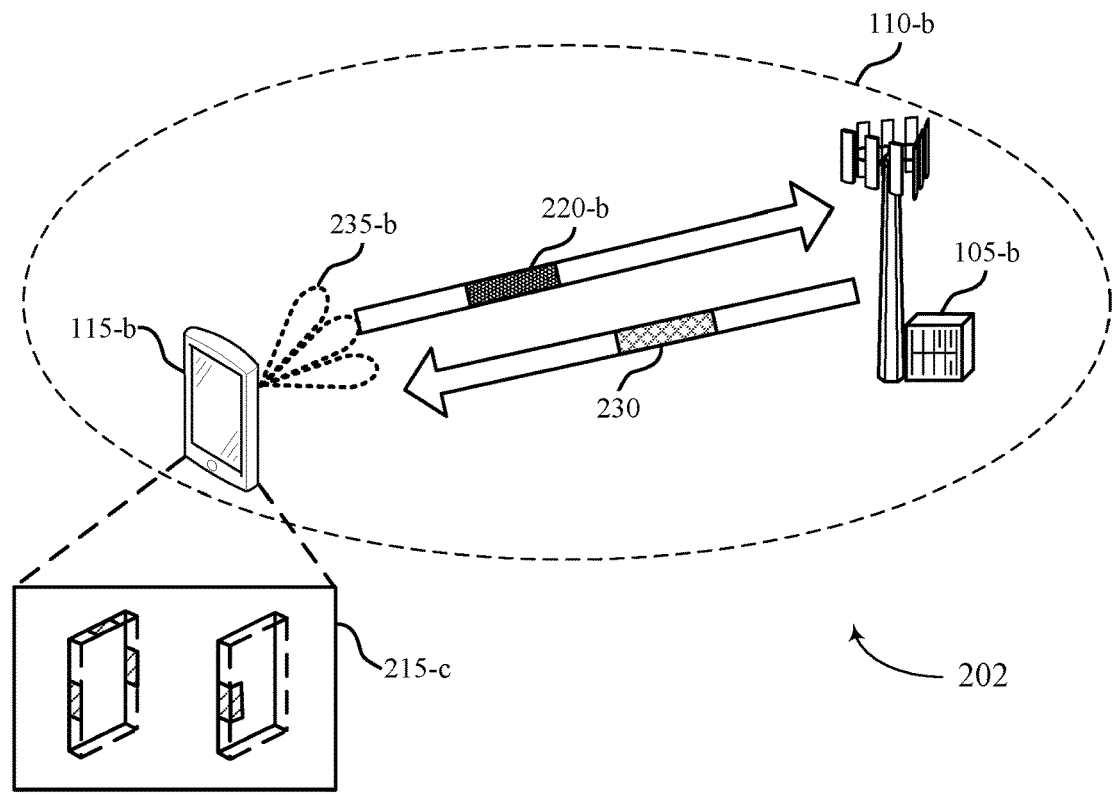

FIG. 2B illustrates an example of a wireless communications system 202 that supports beam management and frequency range limitation according to antenna module capabilities in accordance with one or more aspects of the present disclosure. In some examples, the wireless communications system 202 may implement aspects of wireless communications system 100. The wireless communications system 202 may illustrate communications between a network entity 105-*b* and a UE 115-*b* in a coverage area 110-*b*. The network entity 105-*b* and the UE 115-*b* may be examples of a network entity 105 and a UE 115 as described with reference to FIG. 1.

As described with reference to FIG. 2A, the UE 115-*b* may be configured with an antenna module configuration 215-*c* including either an edge antenna module configuration (e.g., similar to edge antenna module configuration 215-*a*) or an L-shaped antenna module configuration (e.g., similar to L-shaped antenna module configuration 215-*b*). To mitigate potential performance losses affecting link budget, the UE 115-*b* may beamform the communication beams 235-*b* using multiple antennas of the antenna module configuration 215-*c*. In some examples, multiple antenna modules or panels (e.g., each corresponding to an antenna module) having a set of antenna elements may be co-phased or stacked for beamforming in these systems where weights for combining antenna elements to form communication beams may be determined based on measuring reference signals. Additionally, the use of multiple antenna modules may enable some devices to satisfy spherical coverage thresholds (e.g., potentially affected by user body blockage) and may support increased robustness when beam switching over antenna modules.

Individual antenna modules may be relatively expensive. As such devices having multiple antenna modules may incur increased manufacturing costs and thus implementations using a single L-shaped antenna module may mitigate costs while maintaining beamforming performance enhancements. For example, with two sides to a L-shaped antenna module, gains may be realized by polarization combining the sides of an L-shaped antenna module using a beam weight codebook. For example, there may be a substantial performance difference between a linear or planar antenna array type compared to an L-shaped antenna module. One main difference may be caused by the orthogonality between the two sides of the L-shaped antenna module which may lead to co-polarization on one side being correspondent to either co-polarization or cross-polarization on another (e.g., opposite) side (e.g., depending on an angular spread of interest).

Gains from L-shaped antenna modules may be more difficult to realize using fixed beam weight codebooks (e.g., codebooks including fixed sets of beam weights for signal combining). Thus, reference signal resource allocation for determining dynamic beam weights based on an antenna module configuration of a device may support performance at UE 115-*b*. Adaptive or dynamic beam weights with dynamic polarization combining may result in significant performance gains in 1 or 2 linear array antenna modules (e.g., having N antenna elements per side). For example, phases or amplitudes may be constructed for each antenna element by combining polarizations.

In some examples, learning adaptive beam weights may consume reference signal resources proportionate to antenna dimensions. For example, to determine a full set of beam weights, the UE 115-a may use $(N)^2$ reference signals, where N is a quantity of antenna elements in an array. L-shaped antenna modules may include multiple (e.g., two) arrays and thus the UE 115-b may use $(2N)^2$ reference signals to determine a full set of beam weights. Thus, determining a full set of beam weights for an L-shaped antenna module may be resource intensive. For example, reference signal resource consumption may lead to power or thermal overheads. Thus, fixed beam weights (e.g., such as those that may be stored in the RFIC) may be considered.

As such, in the example of wireless communications system 202, the UE 115-b may transmit a capability message 220-b to the network entity 105-b such that the network entity 105-b may allocate an appropriate quantity of resources to the UE 115-b for beam weighting of the communication beams 235-b. For example, adaptive or dynamic beam weight codebooks may be determined for 2N antenna elements (e.g., N on each side of the L-shape) using $(2N)^2$ reference signal. In some examples, reference signals may include synchronization signal blocks (SSBs) occurring at a 20 ms periodicity which may lead to latency durations on the order of multiple seconds. This latency (and any associated power or thermal overhead) may render the practical viability of the gains in a mobility situation untenable. As such, the network entity 105-b may allocate a subset of the total quantity of reference signal resources which may enable the UE 115-b to determine the dynamic beam weights of the communication beams 235-b based on the quantity of resources allocated without incurring the overhead and resource costs of the full set of reference signal resources (e.g., $(2N)^2$). Thus, the network entity 105-b may transmit the reference signal resource allocation 230 in response to the capability message 220-b.

Figure 3:
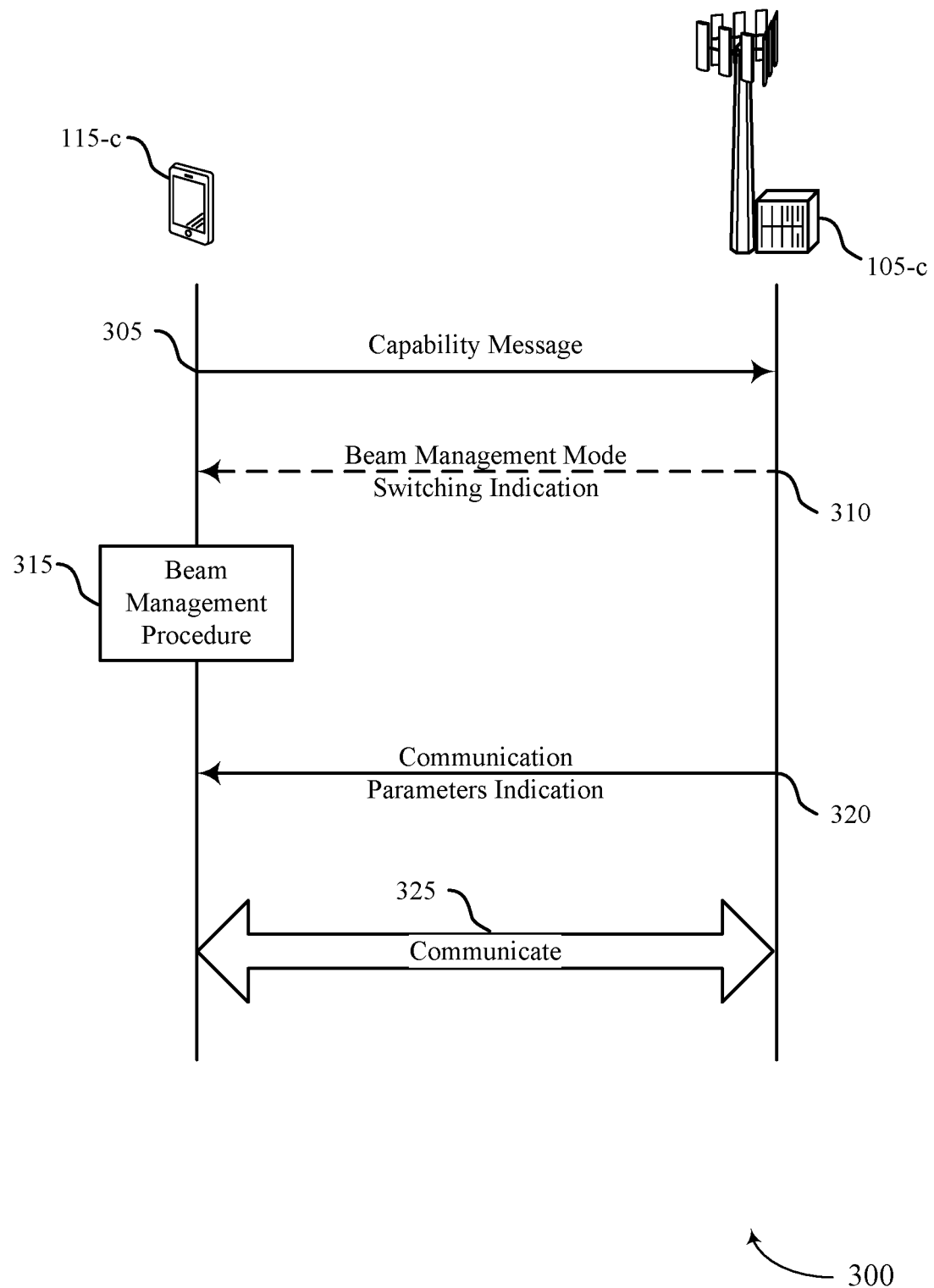
FIG. 3 illustrates an example of a process flow that supports beam management and frequency range limitation according to antenna module capabilities in accordance with one or more aspects of the present disclosure.

FIG. 3 illustrates an example of a process flow 300 that supports beam management and frequency range limitation according to antenna module capabilities in accordance with one or more aspects of the present disclosure. In some examples, the process flow 300 may implement aspects of wireless communications system 100 and wireless communications system 201. The process flow 300 may illustrate communications between a network entity 105-c and a UE 115-c. The network entity 105-c and the UE 115-c may be examples of a network entity 105 and a UE 115 as described with reference to FIGS. 1 and 2. Alternative examples of the following may be implemented, where some processes are performed in a different order than described, are performed by different devices, or are not performed. In some cases, processes may include additional features not mentioned below, or further processes may be added.

At 305, the UE 115-c may transmit a capability message to the network entity 105-c that indicates an antenna module configuration of the UE 115-c. The antenna module configuration may indicate an antenna module format for one or more antenna modules of the UE 115-c. The antenna module format may include a quantity of antenna modules of the UE 115-c, a dimensionality of a set of antenna elements of the one or more antenna modules of the UE 115-c, a geometric shape of the one or more antenna modules of the UE 115-c, a positioning of the one or more antenna modules relative to the UE 115-c (e.g., edge placement positioning), a location of the one or more antenna modules relative to the UE 115-c, or any combination thereof. For example, the antenna module format may indicate whether the UE 115-c has an L-shape antenna module or otherwise, among other information applicable to antenna module capabilities of the UE 115-c.

In some examples, at 310, the UE 115-c may receive an indication for the UE 115-c to switch from a common beam management mode to an independent beam management mode based at least in part on the antenna module configuration. For example, at 305, the capability message may indicate that the UE 115-c is configured with an L-shaped antenna module. In some examples, the network entity may determine that the UE 115-c is to communicate in (e.g., cover) a relatively wide frequency range in which L-shaped antenna modules may perform inefficiently at some frequencies using a common beam management mode. As such, the network entity 105-c may indicate for the UE 115-c to switch from the common beam management mode to the independent beam management mode to communicate in the wider frequency range more efficiently.

At 315, the UE 115-c may perform a beam management procedure (e.g., with the network entity 105-c) in accordance with a beam management mode of a plurality of beam management modes. In some examples, the plurality of beam management modes may include the common beam management mode or the independent beam management mode, among other examples. The beam management mode may be associated with a frequency range and may correspond to the antenna module format for the one or more antenna modules of the UE 115-c. The frequency range may be based on a beamforming capability of the UE 115-c in the frequency range.

For example, the capability message may indicate that the UE 115-c is configured with an L-shaped antenna module and the UE 115-c may perform the beam management procedure in accordance with the common beam management mode using a first frequency range that is smaller than a frequency range capability of the UE 115-c. In some such examples, the network entity may determine that the UE 115-c does not need to communicate in (e.g., cover) the relatively wide frequency range in which L-shaped antenna modules may perform inefficiently at some frequencies using a common beam management mode and thus may narrow the frequency range in which the UE 115-c is to perform common beam management. For example, the network entity may transmit a configuration for narrowing the frequency range or may otherwise indicate the frequency range to the UE 115-c. Additionally, or alternatively, the UE 115-c may perform the beam management procedure according to the independent beam management mode for a second frequency range that is larger than the first frequency range.

In some other examples, the capability message may indicate that the UE 115-c is configured with antenna modules supporting linear or planar arrays and the UE 115-c may perform the beam management procedure in accordance with the common beam management mode over the total frequency range capability of the UE 115-c.

At 320, the UE 115-c may receive, based on performing the beam management procedure, an indication of a set of communication parameters for communications using the frequency range. For example, the set of parameters may include a subcarrier spacing for the communications based on the antenna module configuration and the frequency range of the UE 115-c. The set of parameters may include an indication for the UE 115-c to communicate in or to perform beam management using a subset of the frequency range or the frequency range based on the antenna module configuration and the beam management mode. The subset of the frequency range may be indicated based on a carrier frequency offset associated with the subset of the frequency range.

At 325, the UE 115-c may communicate one or more messages using the frequency range and the one or more antenna modules of the UE 115-c with the network entity 105-c based on the indicated set of communication parameters. For example, the UE 115-c may communicate the one or more messages using a first set of beam weights corresponding to the subset of the frequency range based on the indicated set of communication parameters. Additionally, or alternatively, the UE 115-c may communicate the one or more messages using a second set of beam weights corresponding to the frequency range based on the indicated set of communication parameters.

Figure 4:
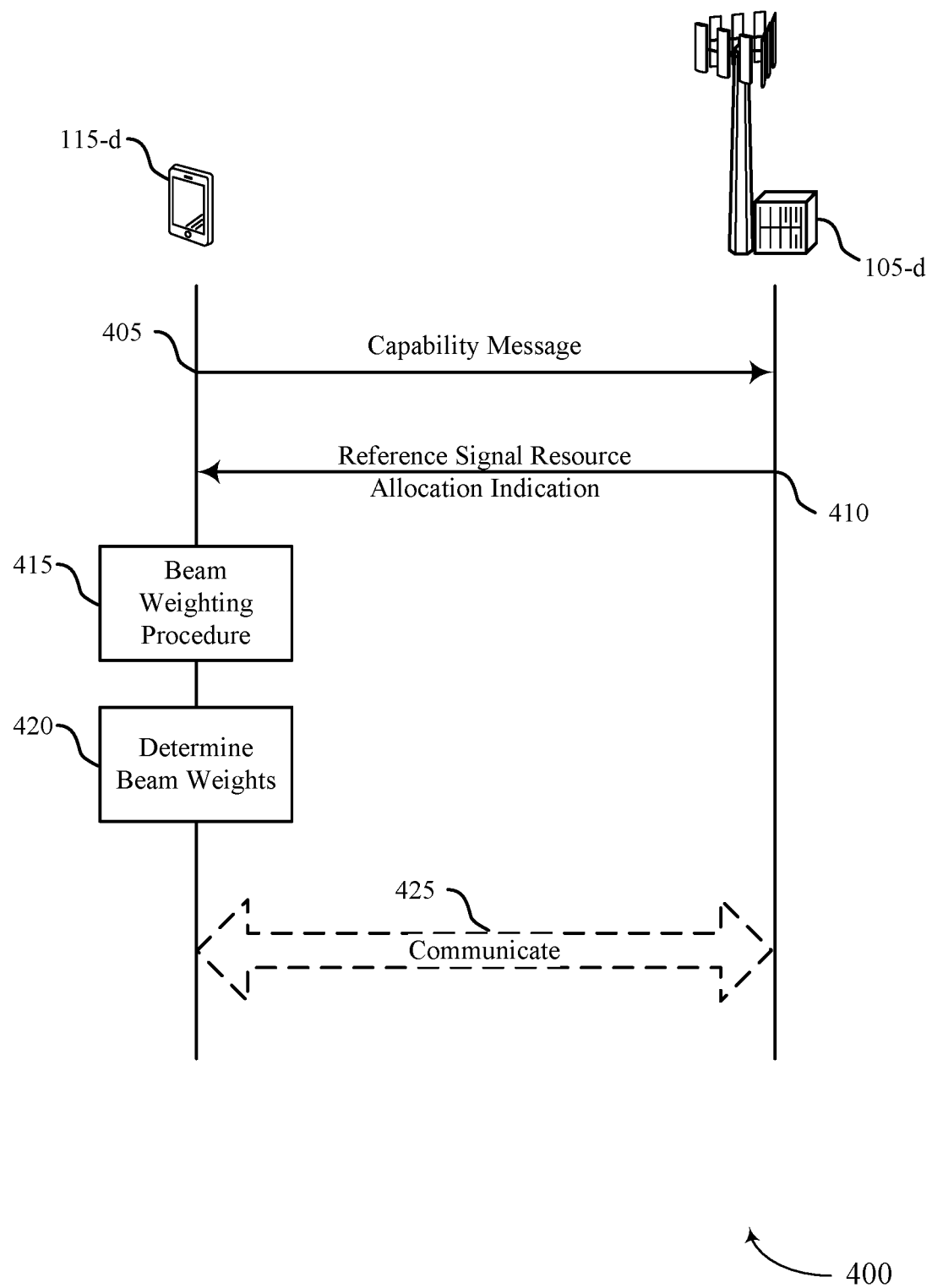
FIG. 4 illustrates an example of a process flow that supports beam management and frequency range limitation according to antenna module capabilities in accordance with one or more aspects of the present disclosure.

FIG. 4 illustrates an example of a process flow 400 that supports beam management and frequency range limitation according to antenna module capabilities in accordance with one or more aspects of the present disclosure. In some examples, the process flow 400 may implement aspects of wireless communications system 100 and wireless communications system 202. The process flow 400 may illustrate communications between a network entity 105-d and a UE 115-d. The network entity 105-d and the UE 115-d may be examples of a network entity 105 and a UE 115 as described with reference to FIGS. 1 and 2. Alternative examples of the following may be implemented, where some processes are performed in a different order than described, are performed by different devices, or are not performed. In some cases, processes may include additional features not mentioned below, or further processes may be added.

At 405, the UE 115-d may transmit a capability message to the network entity 105-d that indicates an antenna module configuration of the UE 115-d. The antenna module configuration may indicate an antenna module format for one or more antenna modules of the UE 115-d. The antenna module format may include a quantity of antenna modules of the UE 115-d, a dimensionality of a set of antenna elements of the one or more antenna modules of the UE 115-d, a geometric shape of the one or more antenna modules of the UE 115-d, a positioning of the one or more antenna modules relative to the UE 115-d (e.g., edge placement positioning), a location of the one or more antenna modules relative to the UE 115-d, or any combination thereof. For example, the antenna module format may indicate whether the UE 115-d has an L-shape antenna module or otherwise, among other information applicable to antenna module capabilities of the UE 115-d.

At 410, the network entity 105-d may transmit a reference signal resource allocation indication to the UE 115-d for a beam weighting procedure. The reference signal resource allocation may correspond to the antenna module format for the one or more antenna modules of the UE 115-d and may indicate a quantity of reference signal resources (e.g., SSBs, CSI-RS resources) for determining a codebook of beam weights or a set beam weights for beamforming at the UE 115-d. In some examples, the reference signal resource allocation may indicate one or more parameters (e.g., resource periodicity, a quantity of frames or subframes over which the resources are distributed, types of reference signals to be communicated, an indication of contiguous or non-contiguous resources) corresponding to the quantity of allocated reference signal resources. The quantity of reference signal resources may be allocated for one or more reference signals for the beam weighting procedure.

In some examples, at 410, the UE 115-d may receive an indication of a subset of reference signal resources of a total set of reference signal resources that is based on the antenna module configuration of the UE and the beam weighting procedure may be performed using the subset of reference signal resources. For example, the capability message may indicate that the UE 115-d is configured with an L-shaped antenna module and the network entity 105-d may allocate a fewer quantity of resources to the UE 115-d than if the UE 115-d were configured with a linear or a planar antenna module because an L-shaped antenna module may include a larger quantity of individual antenna elements than a linear or planar antenna module. The total set of reference signal resources may be a function of the quantity of antenna elements in the antenna module format (e.g., $((2N)^2$ reference signal resources) and thus allocating a reference signal resource for each antenna element of an L-shaped antenna module may incur additional overhead (e.g., latency, power overhead, thermal overhead).

At 415, the UE 115-d may perform the beam weighting procedure using the set of allocated resources for a set of antenna elements corresponding to the antenna module format based on the reference signal resource allocation.

At 420, the UE 115-d may determine a set of beam weights for communications at the UE based on performing the beam weighting procedure. For example, the UE 115-d may determine beam weights for combining signals communicated at the set of antenna elements of the antenna module.

At 425, the UE 115-d may communicate with the network entity 105-d via beamformed communications using the determined beam weights.

Figure 5:
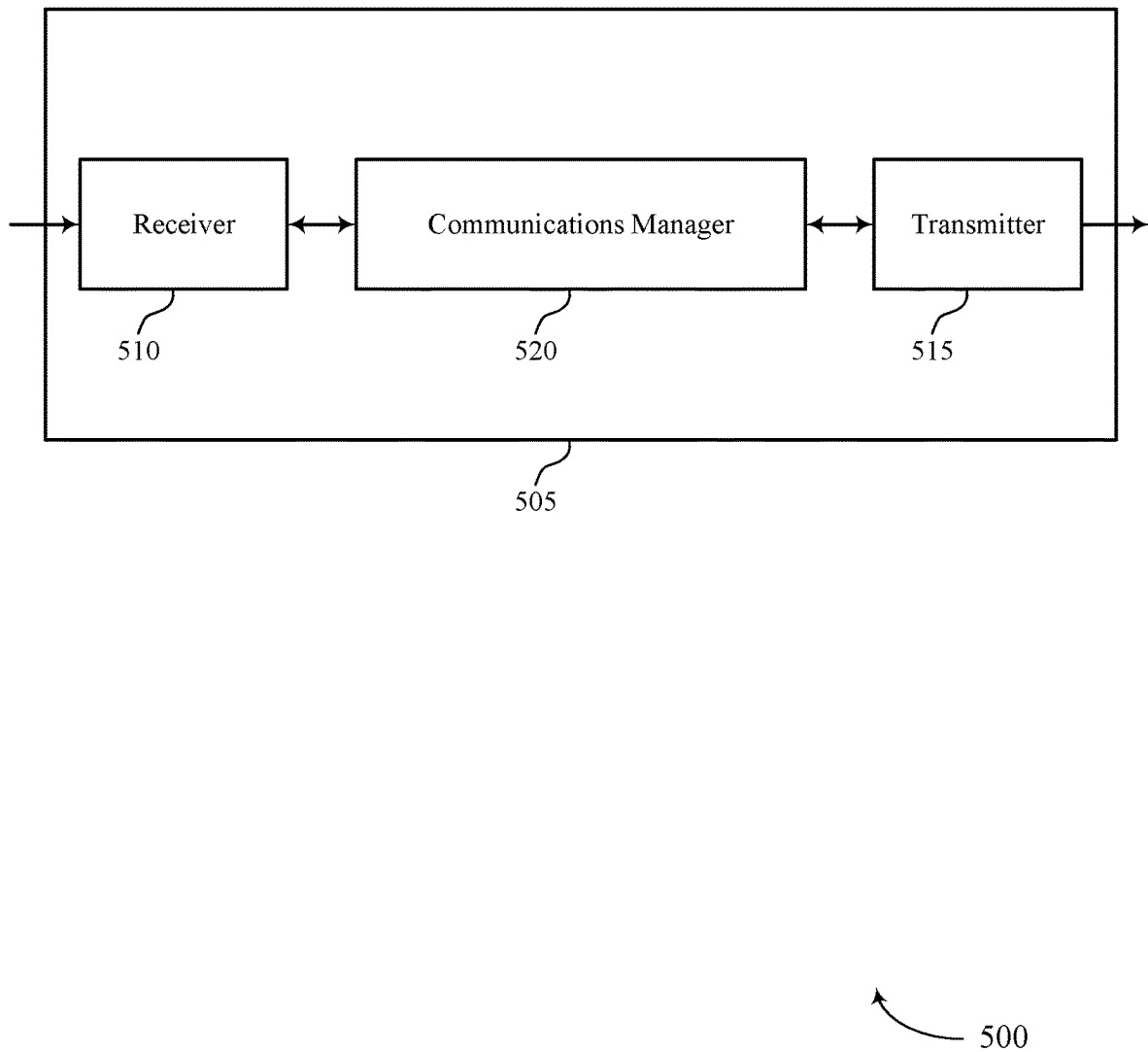
FIGS. 5 and 6 illustrate block diagrams of devices that support beam management and frequency range limitation according to antenna module capabilities in accordance with one or more aspects of the present disclosure.

FIG. 5 illustrates a block diagram 500 of a device 505 that supports beam management and frequency range limitation according to antenna module capabilities in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam management and frequency range limitation according to antenna module capabilities). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam management and frequency range limitation according to antenna module capabilities). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of beam management and frequency range limitation according to antenna module capabilities as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 may be configured as or otherwise support a means for transmitting a capability message that indicates an antenna module configuration of the UE, the antenna module configuration indicating an antenna module format for one or more antenna modules of the UE. The communications manager 520 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The communications manager 520 may be configured as or otherwise support a means for receiving, based on the beam management procedure, an indication of a set of communication parameters for communications using the frequency range. The communications manager 520 may be configured as or otherwise support a means for communicating, based at least in part on the set of communication parameters, one or more messages using the frequency range and the one or more antenna modules of the UE.

Additionally, or alternatively, the communications manager 520 may support wireless communications in accordance with examples as disclosed herein. For example, the communications manager 520 may be configured as or otherwise support a means for transmitting a capability message that indicates an antenna module configuration of the UE, the antenna module configuration indicating an antenna module format for one or more antenna modules of the UE. The communications manager 520 may be configured as or otherwise support a means for receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure. The communications manager 520 may be configured as or otherwise support a means for performing the beam weighting procedure using the set of allocated resources for a set of antenna elements corresponding to the antenna module format based on the reference signal resource allocation.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources, among other examples.

Figure 6:
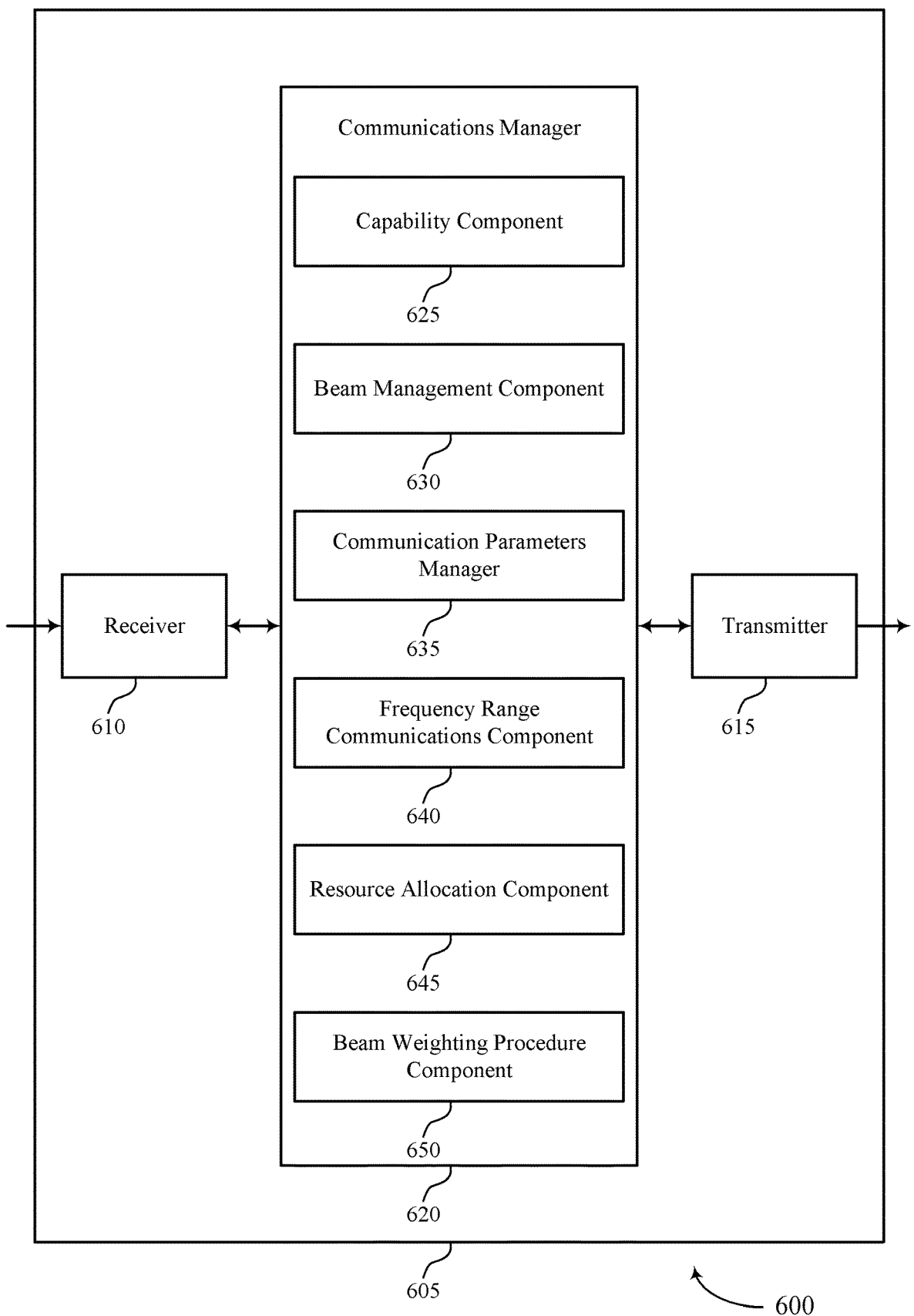

FIG. 6 illustrates a block diagram 600 of a device 605 that supports beam management and frequency range limitation according to antenna module capabilities in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam management and frequency range limitation according to antenna module capabilities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam management and frequency range limitation according to antenna module capabilities). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of beam management and frequency range limitation according to antenna module capabilities as described herein. For example, the communications manager 620 may include a capability component 625, a beam management component 630, a communication parameters manager 635, a frequency range communications component 640, a resource allocation component 645, a beam weighting procedure component 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The capability component 625 may be configured as or otherwise support a means for transmitting a capability message that indicates an antenna module configuration of the UE, the antenna module configuration indicating an antenna module format for one or more antenna modules of the UE. The beam management component 630 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The communication parameters manager 635 may be configured as or otherwise support a means for receiving, based on the beam management procedure, an indication of a set of communication parameters for communications using the frequency range. The frequency range communications component 640 may be configured as or otherwise support a means for communicating, based on the set of communication parameters, one or more messages using the frequency range and the one or more antenna modules of the UE.

Additionally, or alternatively, the communications manager 620 may support wireless communications in accordance with examples as disclosed herein. The capability component 625 may be configured as or otherwise support a means for transmitting a capability message that indicates an antenna module configuration of the UE, the antenna module configuration indicating an antenna module format for one or more antenna modules of the UE. The resource allocation component 645 may be configured as or otherwise support a means for receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure. The beam weighting procedure component 650 may be configured as or otherwise support a means for performing the beam weighting procedure using the set of allocated resources for a set of antenna elements corresponding to the antenna module format based on the reference signal resource allocation.

Figure 7:
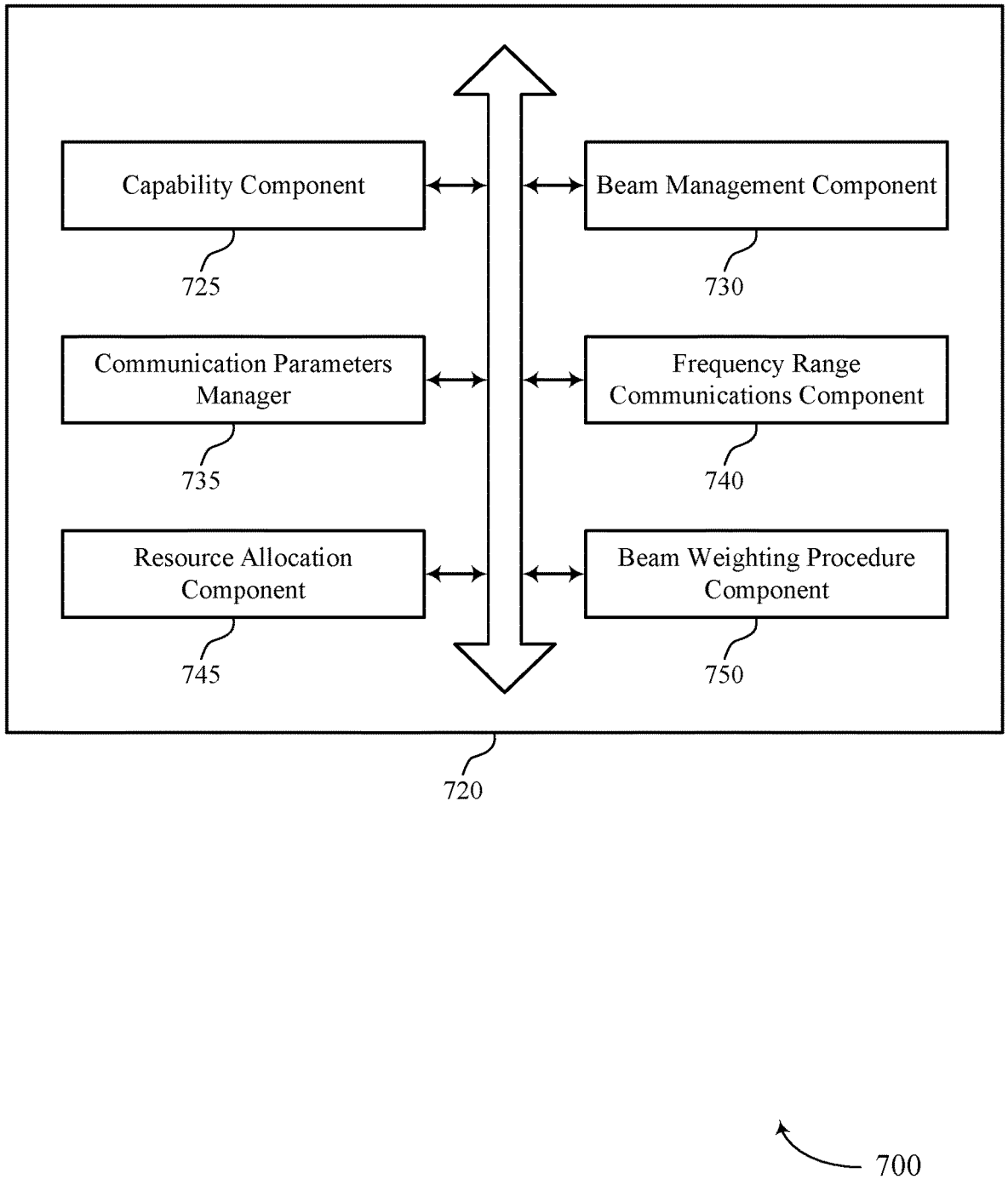
FIG. 7 illustrates a block diagram of a communications manager that supports beam management and frequency range limitation according to antenna module capabilities in accordance with one or more aspects of the present disclosure.

FIG. 7 illustrates a block diagram 700 of a communications manager 720 that supports beam management and frequency range limitation according to antenna module capabilities in accordance with one or more aspects of the present disclosure. The communications manager 720 may be an example of aspects of a communications manager 520, a communications manager 620, or both, as described herein. The communications manager 720, or various components thereof, may be an example of means for performing various aspects of beam management and frequency range limitation according to antenna module capabilities as described herein. For example, the communications manager 720 may include a capability component 725, a beam management component 730, a communication parameters manager 735, a frequency range communications component 740, a resource allocation component 745, a beam weighting procedure component 750, or any combination thereof. Each of these components may communicate, directly or indirectly, with one another (e.g., via one or more buses).

The communications manager 720 may support wireless communications in accordance with examples as disclosed herein. The capability component 725 may be configured as or otherwise support a means for transmitting a capability message that indicates an antenna module configuration of the UE, the antenna module configuration indicating an antenna module format for one or more antenna modules of the UE. The beam management component 730 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The communication parameters manager 735 may be configured as or otherwise support a means for receiving, based on the beam management procedure, an indication of a set of communication parameters for communications using the frequency range. The frequency range communications component 740 may be configured as or otherwise support a means for communicating, based on the set of communication parameters, one or more messages using the frequency range and the one or more antenna modules of the UE.

In some examples, to support transmitting the capability message, the capability component 725 may be configured as or otherwise support a means for transmitting an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

In some examples, to support performing the beam management procedure, the beam management component 730 may be configured as or otherwise support a means for performing the beam management procedure in accordance with a common beam management mode associated with a first frequency range that is smaller than a frequency range capability of the UE.

In some examples, the beam management component 730 may be configured as or otherwise support a means for receiving an indication for the UE to switch from a common beam management mode to an independent beam management mode based on the antenna module configuration.

In some examples, to support performing the beam management procedure, the beam management component 730 may be configured as or otherwise support a means for performing the beam management procedure in accordance with the independent beam management mode, where the independent beam management mode is associated with a second frequency range that is larger than the frequency range.

In some examples, the frequency range is based on a beamforming capability of the UE in the frequency range.

In some examples, the indication of the set of communication parameters includes a subcarrier spacing for the communications based on the antenna module configuration and the frequency range.

In some examples, the indication of the set of communication parameters includes an indication for the UE to use a subset of the frequency range or the frequency range for the communications based on the antenna module configuration and the beam management mode.

In some examples, to support communicating the one or more messages, the communication parameters manager 735 may be configured as or otherwise support a means for communicating, based on the set of communication parameters, the one or more messages using a first set of beam weights corresponding to the subset of the frequency range. In some examples, to support communicating the one or more messages, the communication parameters manager 735 may be configured as or otherwise support a means for communicating, based on the set of communication parameters, the one or more messages using a second set of beam weights corresponding to the frequency range.

In some examples, the subset of the frequency range is indicated based on a carrier frequency offset associated with the subset of the frequency range.

Additionally, or alternatively, the communications manager 720 may support wireless communications in accordance with examples as disclosed herein. In some examples, the capability component 725 may be configured as or otherwise support a means for transmitting a capability message that indicates an antenna module configuration of the UE, the antenna module configuration indicating an antenna module format for one or more antenna modules of the UE. The resource allocation component 745 may be configured as or otherwise support a means for receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure. The beam weighting procedure component 750 may be configured as or otherwise support a means for performing the beam weighting procedure using the set of allocated resources for a set of antenna elements corresponding to the antenna module format based on the reference signal resource allocation.

In some examples, to support transmitting the capability message, the capability component 725 may be configured as or otherwise support a means for transmitting an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

In some examples, the beam weighting procedure component 750 may be configured as or otherwise support a means for determining a set of beam weights for communications at the UE based on performing the beam weighting procedure.

In some examples, to support receiving the indication of the reference signal resource allocation, the resource allocation component 745 may be configured as or otherwise support a means for receiving an indication of a subset of reference signal resources of a total set of reference signal resources that is based on the antenna module configuration of the UE, where the beam weighting procedure is performed using the subset of reference signal resources.

In some examples, the total set of reference signal resources is a function of a quantity of antenna elements in the antenna module format.

Figure 8:
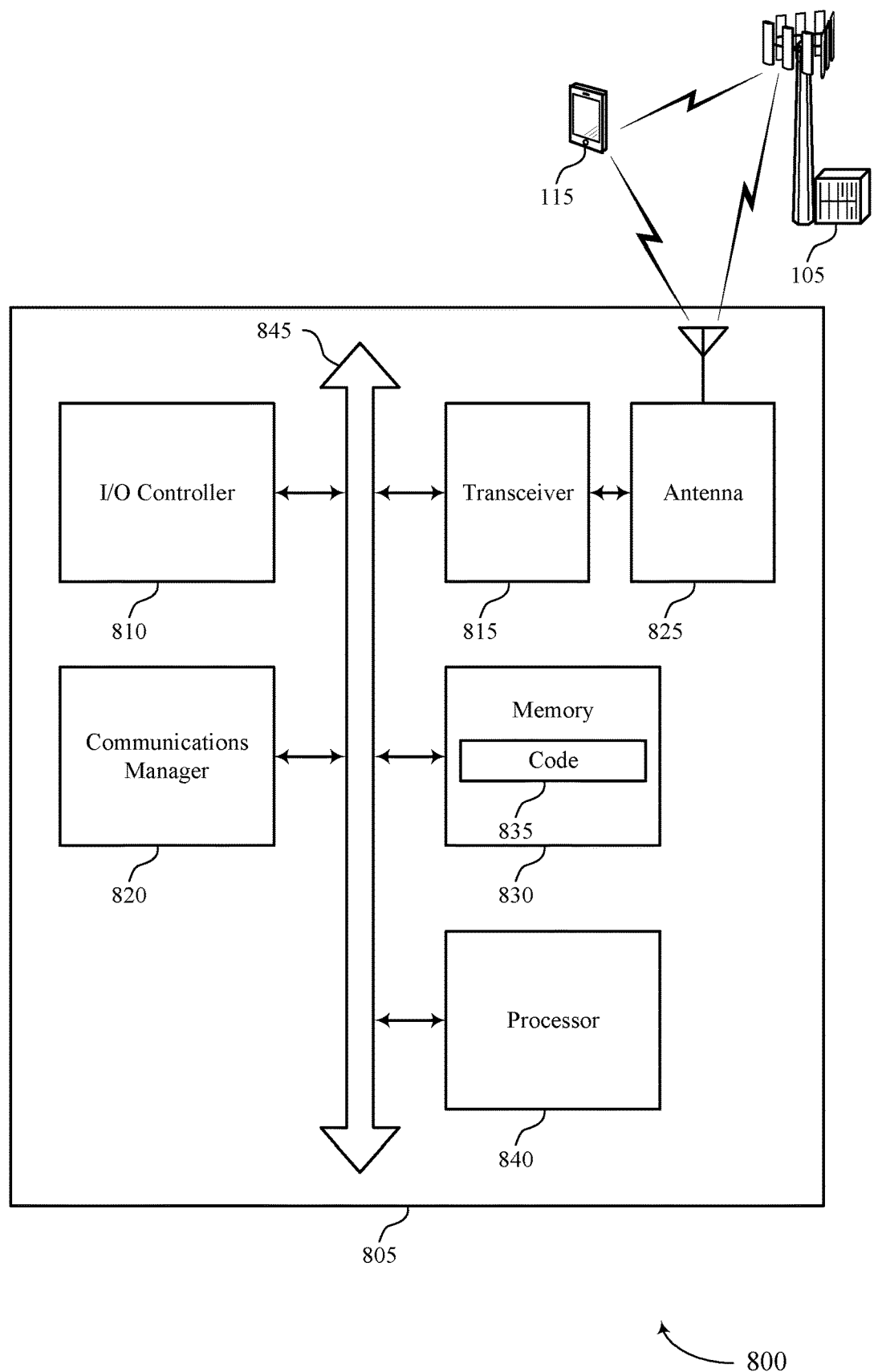
FIG. 8 illustrates a diagram of a system including a device that supports beam management and frequency range limitation according to antenna module capabilities in accordance with one or more aspects of the present disclosure.

FIG. 8 illustrates a diagram of a system 800 including a device 805 that supports beam management and frequency range limitation according to antenna module capabilities in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beam management and frequency range limitation according to antenna module capabilities). For example, the device 805 or a component of the device 805 may include a processor 840 and memory 830 coupled with or to the processor 840, the processor 840 and memory 830 configured to perform various functions described herein.

The communications manager 820 may support wireless communications in accordance with examples as disclosed herein. For example, the communications manager 820 may be configured as or otherwise support a means for transmitting a capability message that indicates an antenna module configuration of the UE, the antenna module configuration indicating an antenna module format for one or more antenna modules of the UE. The communications manager 820 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The communications manager 820 may be configured as or otherwise support a means for receiving, based on the beam management procedure, an indication of a set of communication parameters for communications using the frequency range. The communications manager 820 may be configured as or otherwise support a means for communicating, based at least in part on the set of communication parameters, one or more messages using the frequency range and the one or more antenna modules of the UE.

Additionally, or alternatively, the communications manager 820 may support wireless communications in accordance with examples as disclosed herein. For example, the communications manager 820 may be configured as or otherwise support a means for transmitting a capability message that indicates an antenna module configuration of the UE, the antenna module configuration indicating an antenna module format for one or more antenna modules of the UE. The communications manager 820 may be configured as or otherwise support a means for receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure. The communications manager 820 may be configured as or otherwise support a means for performing the beam weighting procedure using the set of allocated resources for a set of antenna elements corresponding to the antenna module format based on the reference signal resource allocation.

By including or configuring the communications manager 820 in accordance with examples as described herein, the device 805 may support techniques for improved communication reliability, improved user experience related to improved signal quality and expanded coverage, and more efficient utilization of communication resources, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of beam management and frequency range limitation according to antenna module capabilities as described herein, or the processor 840 and the memory 830 may be otherwise configured to perform or support such operations.

Figure 9:
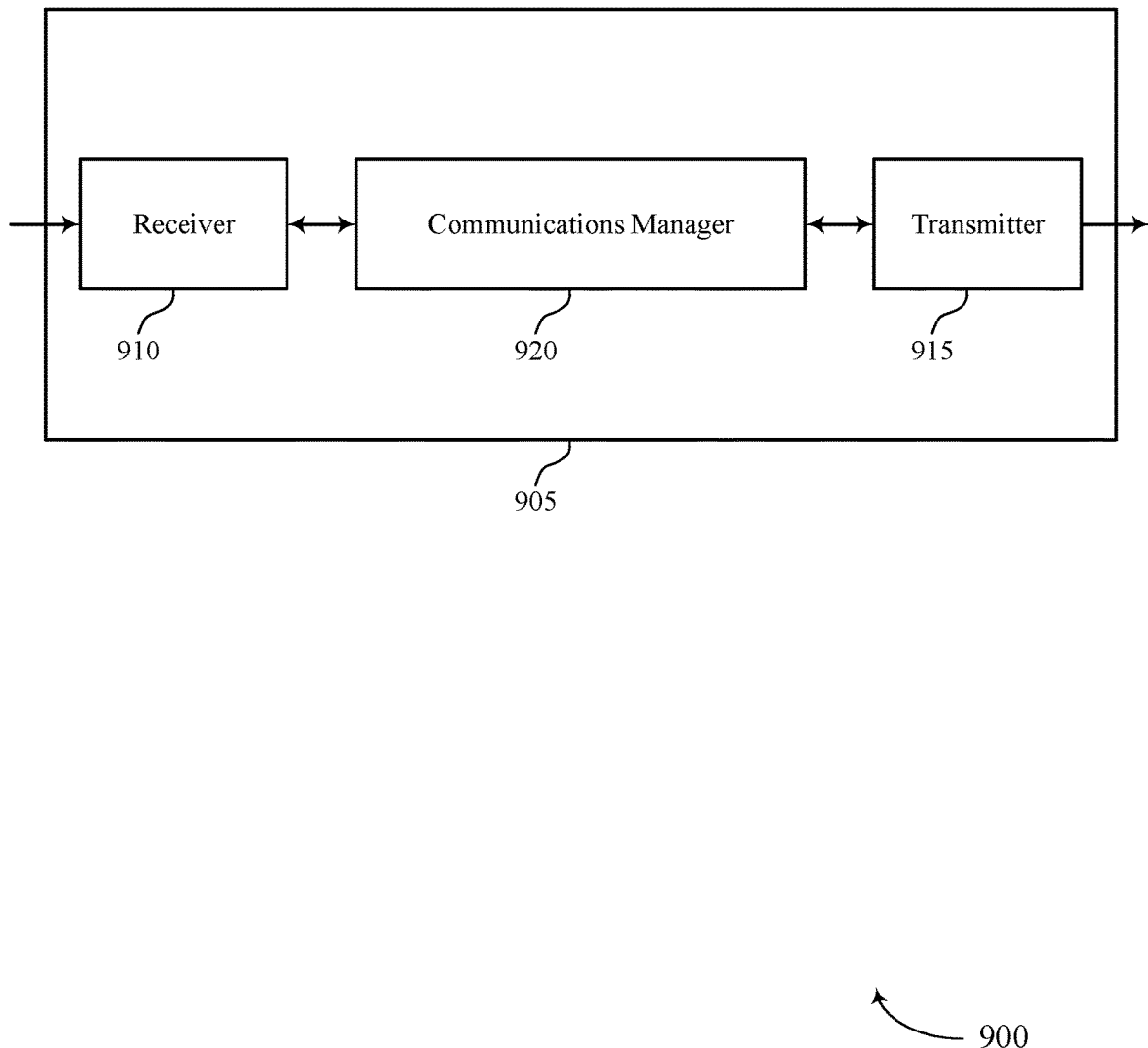
FIGS. 9 and 10 illustrate block diagrams of devices that support beam management and frequency range limitation according to antenna module capabilities in accordance with one or more aspects of the present disclosure.

FIG. 9 illustrates a block diagram 900 of a device 905 that supports beam management and frequency range limitation according to antenna module capabilities in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of beam management and frequency range limitation according to antenna module capabilities as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 may be configured as or otherwise support a means for receiving, from a UE, a capability message that indicates an antenna module configuration of the UE, the antenna module configuration indicating an antenna module format for one or more antenna modules of the UE. The communications manager 920 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The communications manager 920 may be configured as or otherwise support a means for transmitting, based on the beam management procedure, an indication of a set of communication parameters for communications using the frequency range.

Additionally, or alternatively, the communications manager 920 may support wireless communications in accordance with examples as disclosed herein. For example, the communications manager 920 may be configured as or otherwise support a means for receiving, from a UE, a capability message that indicates an antenna module configuration of the UE, the antenna module configuration indicating an antenna module format for one or more antenna modules of the UE. The communications manager 920 may be configured as or otherwise support a means for transmitting an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption, and more efficient utilization of communication resources, among other examples.

Figure 10:
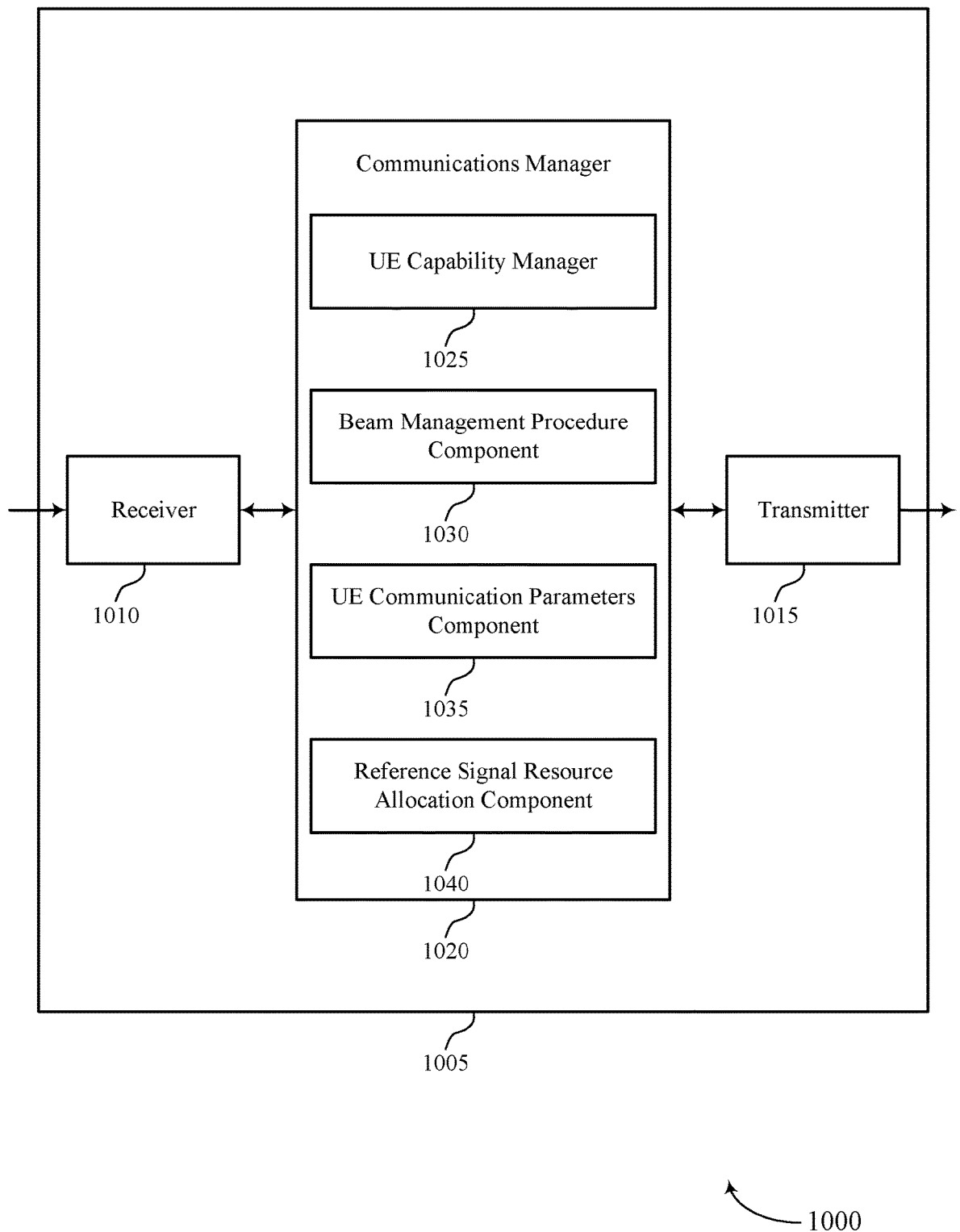

FIG. 10 illustrates a block diagram 1000 of a device 1005 that supports beam management and frequency range limitation according to antenna module capabilities in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of beam management and frequency range limitation according to antenna module capabilities as described herein. For example, the communications manager 1020 may include a UE capability manager 1025, a beam management procedure component 1030, a UE communication parameters component 1035, a reference signal resource allocation component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The UE capability manager 1025 may be configured as or otherwise support a means for receiving, from a UE, a capability message that indicates an antenna module configuration of the UE, the antenna module configuration indicating an antenna module format for one or more antenna modules of the UE. The beam management procedure component 1030 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The UE communication parameters component 1035 may be configured as or otherwise support a means for transmitting, based on the beam management procedure, an indication of a set of communication parameters for communications using the frequency range.

Additionally, or alternatively, the communications manager 1020 may support wireless communications in accordance with examples as disclosed herein. The UE capability manager 1025 may be configured as or otherwise support a means for receiving, from a UE, a capability message that indicates an antenna module configuration of the UE, the antenna module configuration indicating an antenna module format for one or more antenna modules of the UE. The reference signal resource allocation component 1040 may be configured as or otherwise support a means for transmitting an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

Figure 11:
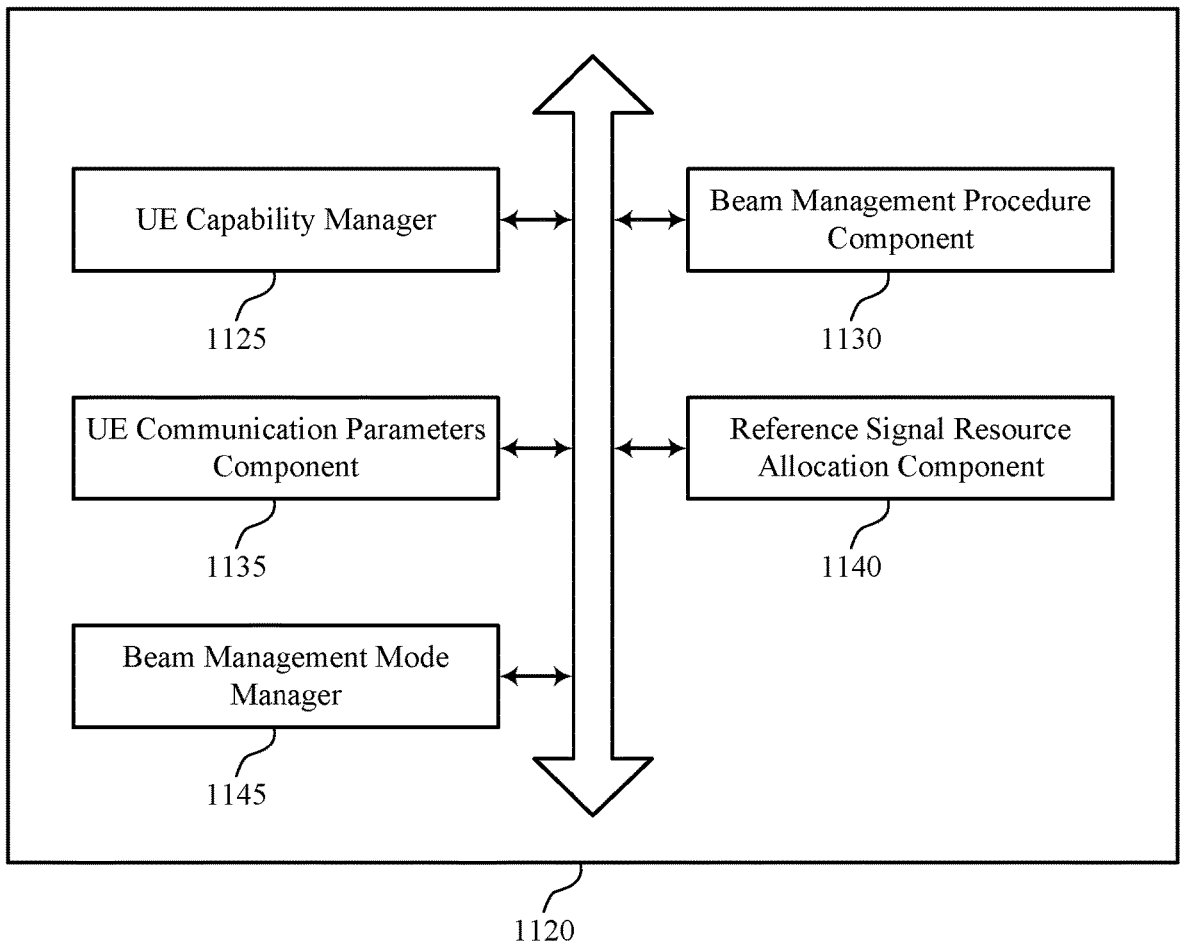
FIG. 11 illustrates a block diagram of a communications manager that supports beam management and frequency range limitation according to antenna module capabilities in accordance with one or more aspects of the present disclosure.

FIG. 11 illustrates a block diagram 1100 of a communications manager 1120 that supports beam management and frequency range limitation according to antenna module capabilities in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of beam management and frequency range limitation according to antenna module capabilities as described herein. For example, the communications manager 1120 may include a UE capability manager 1125, a beam management procedure component 1130, a UE communication parameters component 1135, a reference signal resource allocation component 1140, a beam management mode manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The UE capability manager 1125 may be configured as or otherwise support a means for receiving, from a UE, a capability message that indicates an antenna module configuration of the UE, the antenna module configuration indicating an antenna module format for one or more antenna modules of the UE. The beam management procedure component 1130 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The UE communication parameters component 1135 may be configured as or otherwise support a means for transmitting, based on the beam management procedure, an indication of a set of communication parameters for communications using the frequency range.

In some examples, to support receiving the capability message, the UE capability manager 1125 may be configured as or otherwise support a means for receiving an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

In some examples, to support performing the beam management procedure, the beam management procedure component 1130 may be configured as or otherwise support a means for performing the beam management procedure in accordance with a common beam management mode associated with a first frequency range that is smaller than a frequency range capability of the UE.

In some examples, the beam management mode manager 1145 may be configured as or otherwise support a means for transmitting an indication for the UE to switch from a common beam management mode to an independent beam management mode based on the antenna module configuration.

In some examples, to support performing the beam management procedure, the beam management procedure component 1130 may be configured as or otherwise support a means for performing the beam management procedure in accordance with the independent beam management mode, where the independent beam management mode is associated with a second frequency range that is larger than the frequency range.

In some examples, the frequency range is based on a beamforming capability of the UE in the frequency range. In some examples, the indication of the set of communication parameters includes a subcarrier spacing for the communications based on the antenna module configuration and the frequency range. In some examples, the indication of the set of communication parameters includes an indication for the UE to use a subset of the frequency range or the frequency range for the communications based on the antenna module configuration and the beam management mode.

In some examples, the indication of the set of communication parameters may include a first set of beam weights corresponding to the subset of the frequency range or may include a second set of beam weights corresponding to the frequency range. In some examples, the subset of the frequency range is indicated based on a carrier frequency offset associated with the subset of the frequency range.

Additionally, or alternatively, the communications manager 1120 may support wireless communications in accordance with examples as disclosed herein. In some examples, the UE capability manager 1125 may be configured as or otherwise support a means for receiving, from a UE, a capability message that indicates an antenna module configuration of the UE, the antenna module configuration indicating an antenna module format for one or more antenna modules of the UE. The reference signal resource allocation component 1140 may be configured as or otherwise support a means for transmitting an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

In some examples, to support receiving the capability message, the UE capability manager 1125 may be configured as or otherwise support a means for receiving an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

In some examples, to support transmitting the indication of the reference signal resource allocation, the reference signal resource allocation component 1140 may be configured as or otherwise support a means for transmitting an indication of a subset of reference signal resources of a total set of reference signal resources that is based on the antenna module configuration of the UE, where the subset of reference signal resources is for a beam weighting procedure.

In some examples, the total set of reference signal resources is a function of a quantity of antenna elements in the antenna module format.

Figure 12:
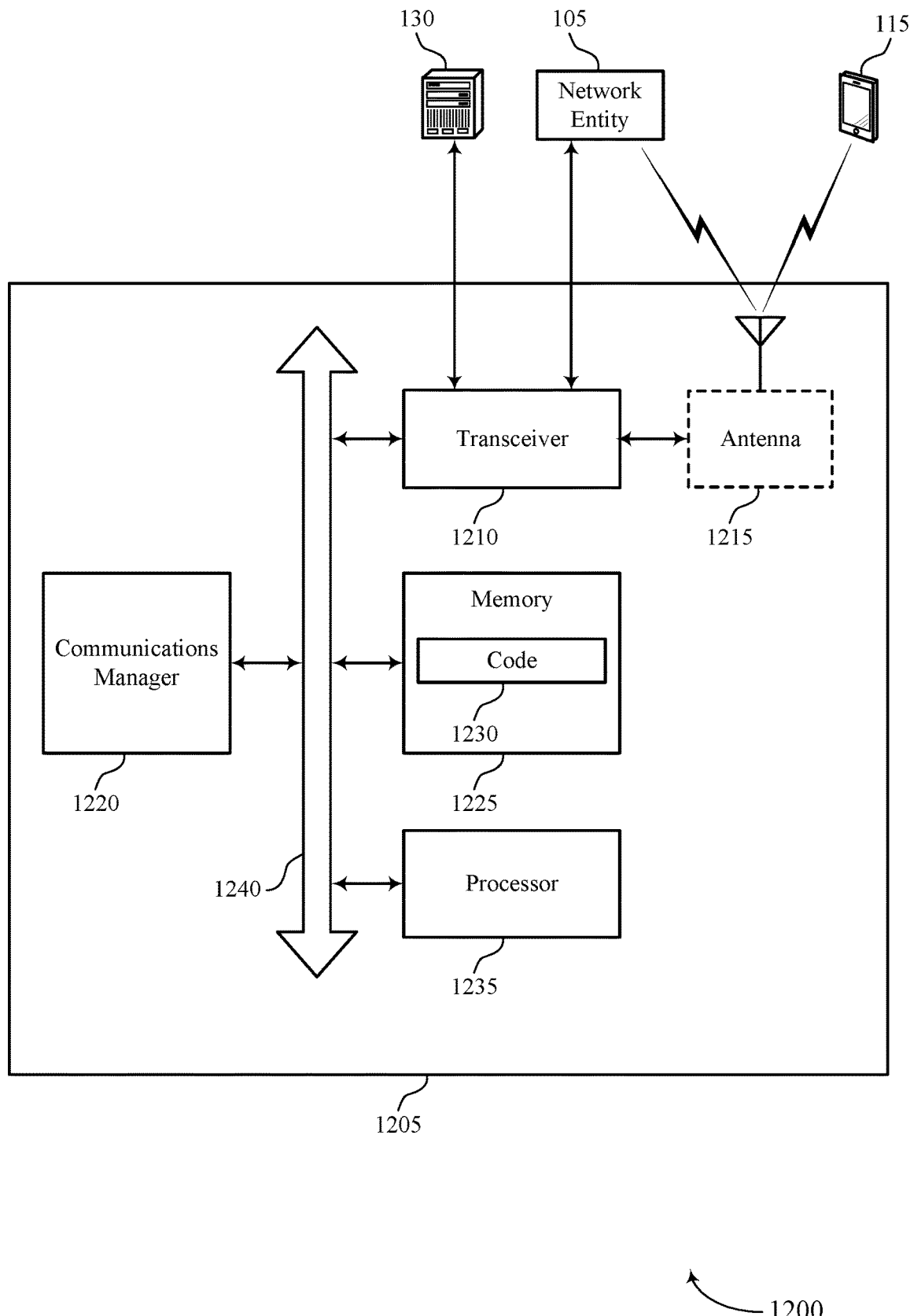
FIG. 12 illustrates a diagram of a system including a device that supports beam management and frequency range limitation according to antenna module capabilities in accordance with one or more aspects of the present disclosure.

FIG. 12 illustrates a diagram of a system 1200 including a device 1205 that supports beam management and frequency range limitation according to antenna module capabilities in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting beam management and frequency range limitation according to antenna module capabilities). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105 and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 may be configured as or otherwise support a means for receiving, from a UE, a capability message that indicates an antenna module configuration of the UE, the antenna module configuration indicating an antenna module format for one or more antenna modules of the UE. The communications manager 1220 may be configured as or otherwise support a means for performing a beam management procedure in accordance with a beam management mode of a set of multiple beam management modes, where the beam management mode is associated with a frequency range and corresponds to the antenna module format for the one or more antenna modules of the UE. The communications manager 1220 may be configured as or otherwise support a means for transmitting, based on the beam management procedure, an indication of a set of communication parameters for communications using the frequency range.

Additionally, or alternatively, the communications manager 1220 may support wireless communications in accordance with examples as disclosed herein. For example, the communications manager 1220 may be configured as or otherwise support a means for receiving, from a UE, a capability message that indicates an antenna module configuration of the UE, the antenna module configuration indicating an antenna module format for one or more antenna modules of the UE. The communications manager 1220 may be configured as or otherwise support a means for transmitting an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure.

By including or configuring the communications manager 1220 in accordance with examples as described herein, the device 1205 may support techniques for improved communication reliability, reduced power consumption, more efficient utilization of communication resources, longer battery life, and expanded coverage, among other examples.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of beam management and frequency range limitation according to antenna module capabilities as described herein, or the processor 1235 and the memory 1225 may be otherwise configured to perform or support such operations.

Figure 13:
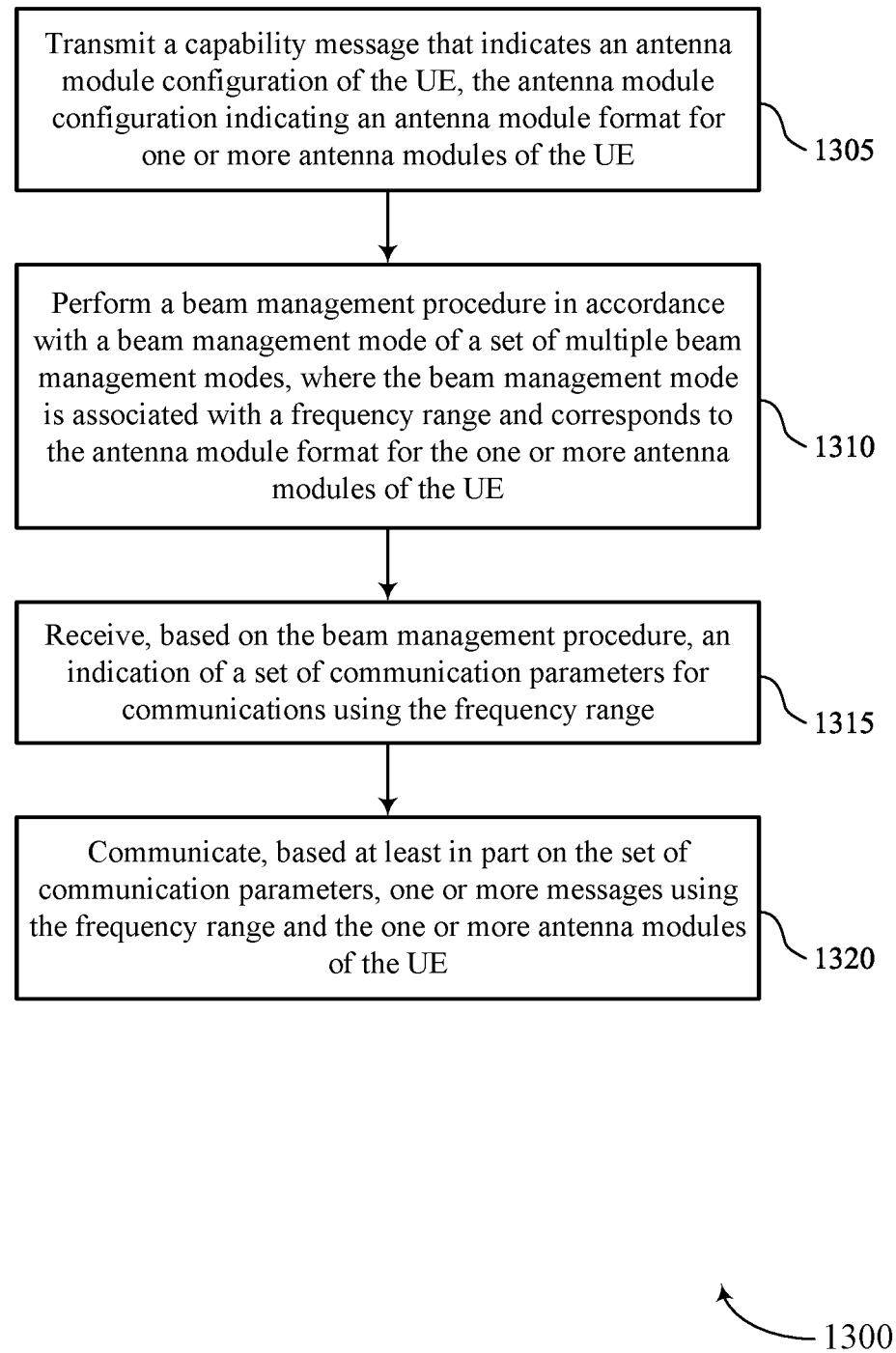
FIGS. 13 through 21 illustrate flowcharts showing methods that support beam management and frequency range limitation according to antenna module capabilities in accordance with one or more aspects of the present disclosure.

FIG. 13 illustrates a flowchart showing a method 1300 that supports beam management and frequency range limitation according to antenna module capabilities in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a capability message that indicates an antenna module configuration of the UE, the antenna module configuration indicating an antenna module format for one or more antenna modules of the UE. The operations of 1305 may be performed in accordance with examples as disclosed herein. In some examples, aspects of the operations of 1305 may be performed by a capability component 725 as described with reference to FIG. 7.

At 1310, the method may include performing a beam management procedure in accordance with a beam management mode of a set of multiple beam management modes, where the beam management mode is associated with a frequency range and corresponds to the antenna module format for the one or more antenna modules of the UE. The operations of 1310 may be performed in accordance with examples as disclosed herein. In some examples, aspects of the operations of 1310 may be performed by a beam management component 730 as described with reference to FIG. 7.

At 1315, the method may include receiving, based on the beam management procedure, an indication of a set of communication parameters for communications using the frequency range. The operations of 1315 may be performed in accordance with examples as disclosed herein. In some examples, aspects of the operations of 1315 may be performed by a communication parameters manager 735 as described with reference to FIG. 7.

At 1320, the method may include communicating, based on the set of communication parameters, one or more messages using the frequency range and the one or more antenna modules of the UE. The operations of 1320 may be performed in accordance with examples as disclosed herein. In some examples, aspects of the operations of 1320 may be performed by a frequency range communications component 740 as described with reference to FIG. 7.

Figure 14:
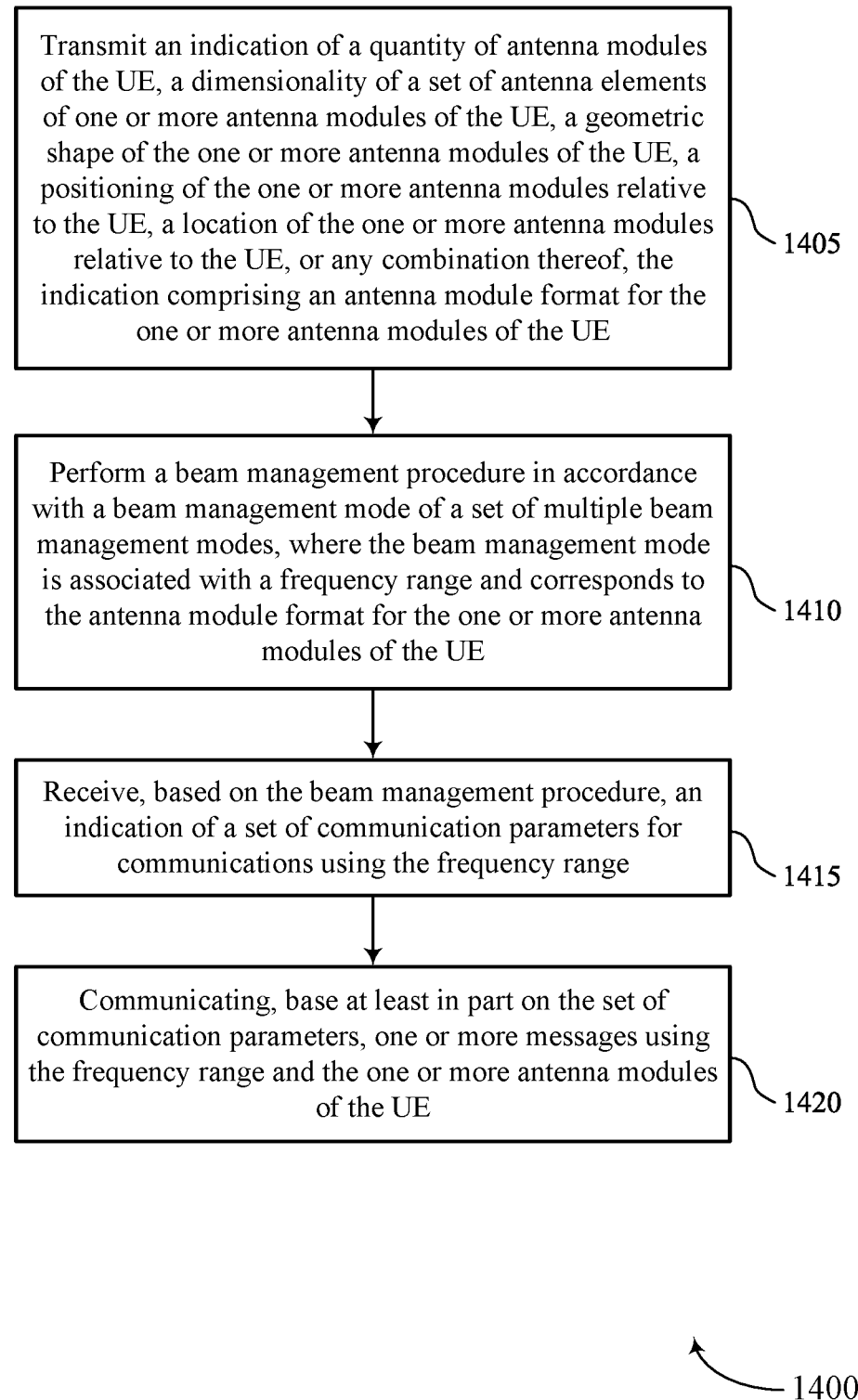

FIG. 14 illustrates a flowchart showing a method 1400 that supports beam management and frequency range limitation according to antenna module capabilities in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting an indication of a quantity of antenna modules of the UE, a dimensionality of a set of antenna elements of one or more antenna modules of the UE, a geometric shape of the one or more antenna modules of the UE, a positioning of the one or more antenna modules relative to the UE, a location of the one or more antenna modules relative to the UE, or any combination thereof, the indication including an antenna module format for the one or more antenna modules of the UE. The operations of 1405 may be performed in accordance with examples as disclosed herein. In some examples, aspects of the operations of 1405 may be performed by a capability component 725 as described with reference to FIG. 7.

At 1410, the method may include performing a beam management procedure in accordance with a beam management mode of a set of multiple beam management modes, where the beam management mode is associated with a frequency range and corresponds to the antenna module format for the one or more antenna modules of the UE. The operations of 1410 may be performed in accordance with examples as disclosed herein. In some examples, aspects of the operations of 1410 may be performed by a beam management component 730 as described with reference to FIG. 7.

At 1415, the method may include receiving, based on the beam management procedure, an indication of a set of communication parameters for communications using the frequency range. The operations of 1415 may be performed in accordance with examples as disclosed herein. In some examples, aspects of the operations of 1415 may be performed by a communication parameters manager 735 as described with reference to FIG. 7.

At 1420, the method may include communicating, based on the set of communication parameters, one or more messages using the frequency range and the one or more antenna modules of the UE. The operations of 1420 may be performed in accordance with examples as disclosed herein. In some examples, aspects of the operations of 1420 may be performed by a frequency range communications component 740 as described with reference to FIG. 7.

Figure 15:
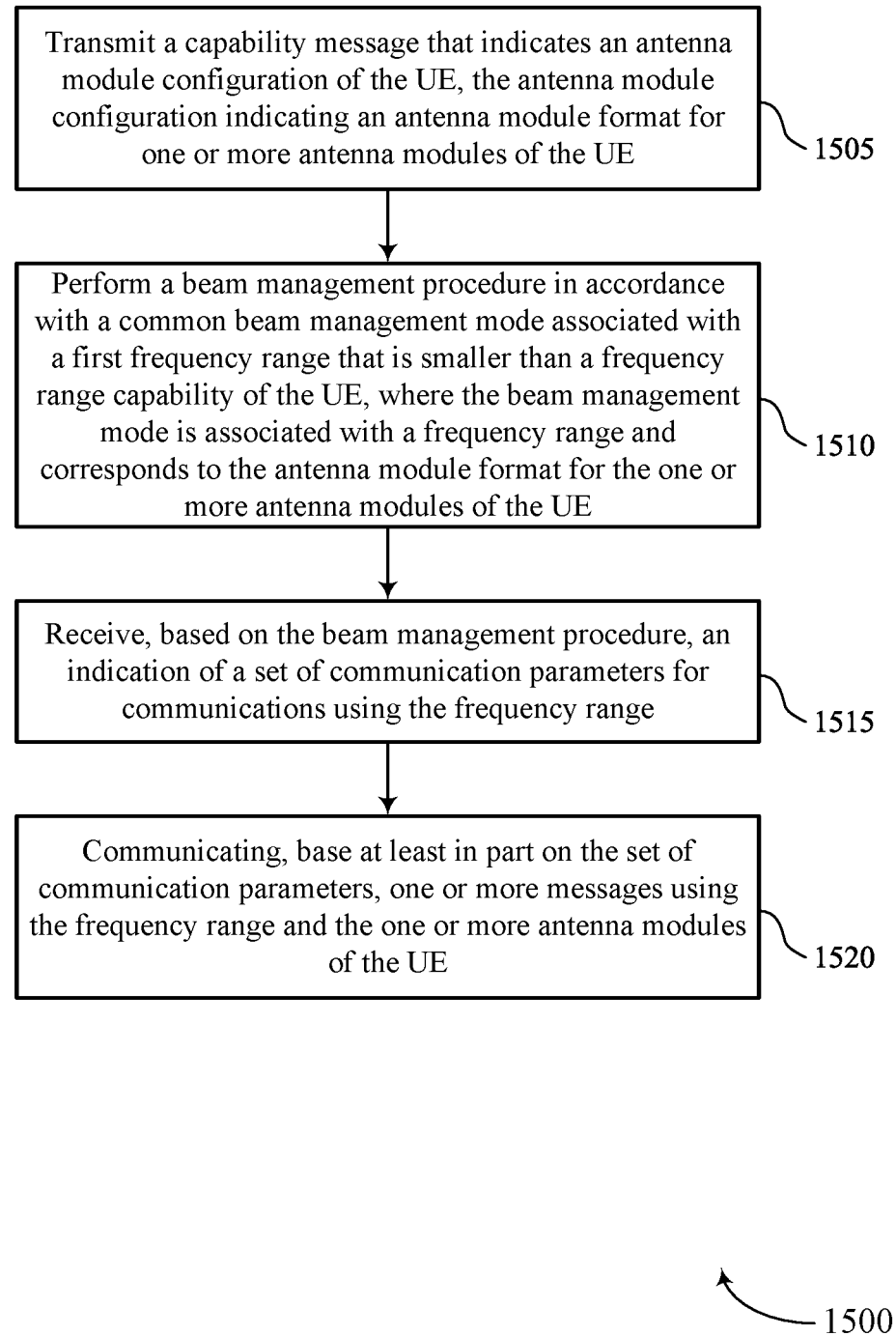

FIG. 15 illustrates a flowchart showing a method 1500 that supports beam management and frequency range limitation according to antenna module capabilities in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a capability message that indicates an antenna module configuration of the UE, the antenna module configuration indicating an antenna module format for one or more antenna modules of the UE. The operations of 1505 may be performed in accordance with examples as disclosed herein. In some examples, aspects of the operations of 1505 may be performed by a capability component 725 as described with reference to FIG. 7.

At 1510, the method may include performing a beam management procedure in accordance with a common beam management mode associated with a first frequency range that is smaller than a frequency range capability of the UE, where the beam management mode is associated with a frequency range and corresponds to the antenna module format for the one or more antenna modules of the UE. The operations of 1510 may be performed in accordance with examples as disclosed herein. In some examples, aspects of the operations of 1510 may be performed by a beam management component 730 as described with reference to FIG. 7.

At 1515, the method may include receiving, based on the beam management procedure, an indication of a set of communication parameters for communications using the frequency range. The operations of 1515 may be performed in accordance with examples as disclosed herein. In some examples, aspects of the operations of 1515 may be performed by a communication parameters manager 735 as described with reference to FIG. 7.

At 1520, the method may include communicating, based on the set of communication parameters, one or more messages using the frequency range and the one or more antenna modules of the UE. The operations of 1520 may be performed in accordance with examples as disclosed herein. In some examples, aspects of the operations of 1520 may be performed by a frequency range communications component 740 as described with reference to FIG. 7.

Figure 16:
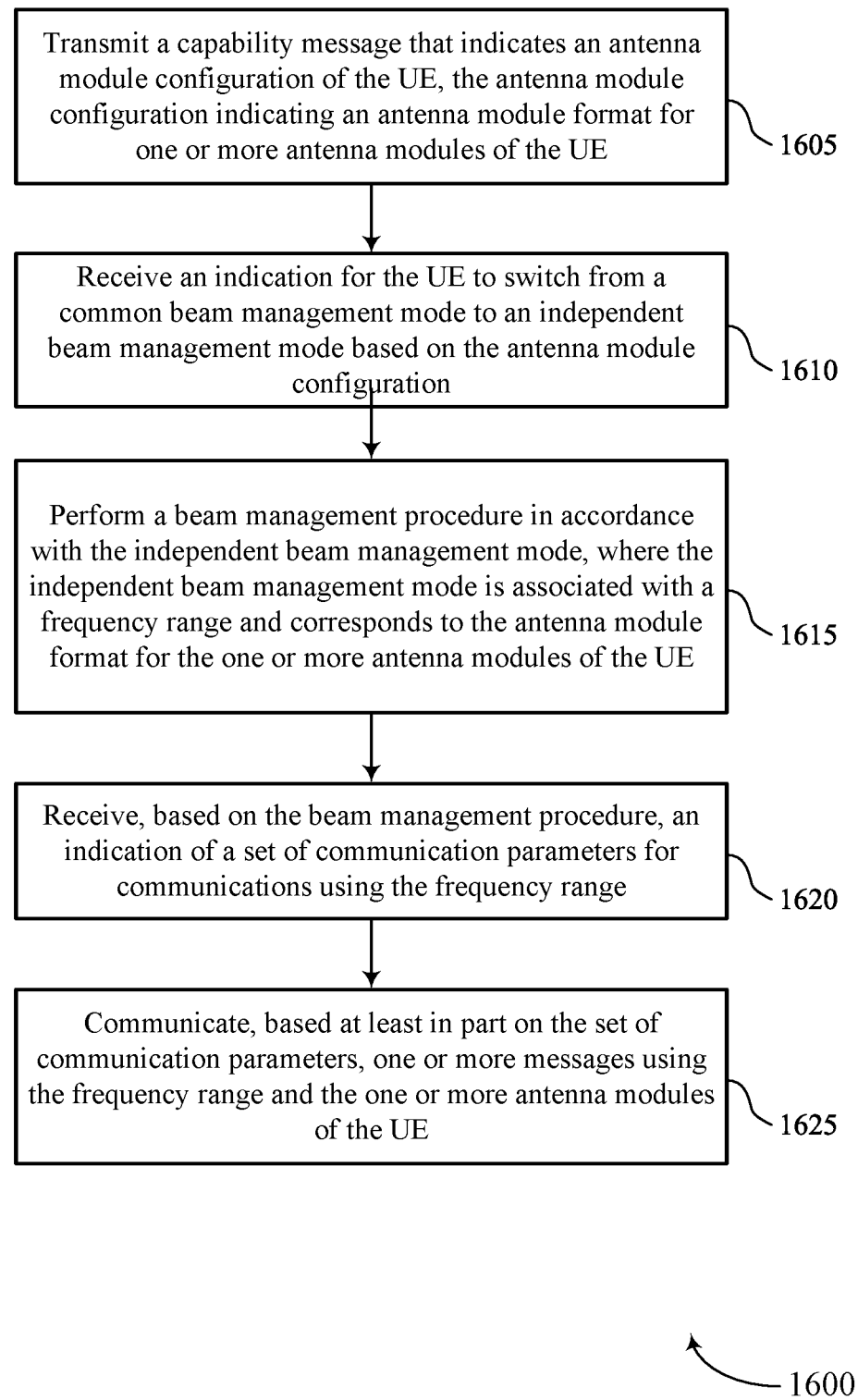

FIG. 16 illustrates a flowchart showing a method 1600 that supports beam management and frequency range limitation according to antenna module capabilities in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include transmitting a capability message that indicates an antenna module configuration of the UE, the antenna module configuration indicating an antenna module format for one or more antenna modules of the UE. The operations of 1605 may be performed in accordance with examples as disclosed herein. In some examples, aspects of the operations of 1605 may be performed by a capability component 725 as described with reference to FIG. 7.

At 1610, the method may include receiving an indication for the UE to switch from a common beam management mode to an independent beam management mode based on the antenna module configuration. The operations of 1610 may be performed in accordance with examples as disclosed herein. In some examples, aspects of the operations of 1610 may be performed by a beam management component 730 as described with reference to FIG. 7.

At 1615, the method may include performing a beam management procedure in accordance with the independent beam management mode, where the independent beam management mode is associated with a frequency range and corresponds to the antenna module format for the one or more antenna modules of the UE. The operations of 1615 may be performed in accordance with examples as disclosed herein. In some examples, aspects of the operations of 1615 may be performed by a beam management component 730 as described with reference to FIG. 7.

At 1620, the method may include receiving, based on the beam management procedure, an indication of a set of communication parameters for communications using the frequency range. The operations of 1620 may be performed in accordance with examples as disclosed herein. In some examples, aspects of the operations of 1620 may be performed by a communication parameters manager 735 as described with reference to FIG. 7.

At 1625, the method may include communicating, based on the set of communication parameters, one or more messages using the frequency range and the one or more antenna modules of the UE. The operations of 1625 may be performed in accordance with examples as disclosed herein. In some examples, aspects of the operations of 1625 may be performed by a frequency range communications component 740 as described with reference to FIG. 7.

Figure 17:
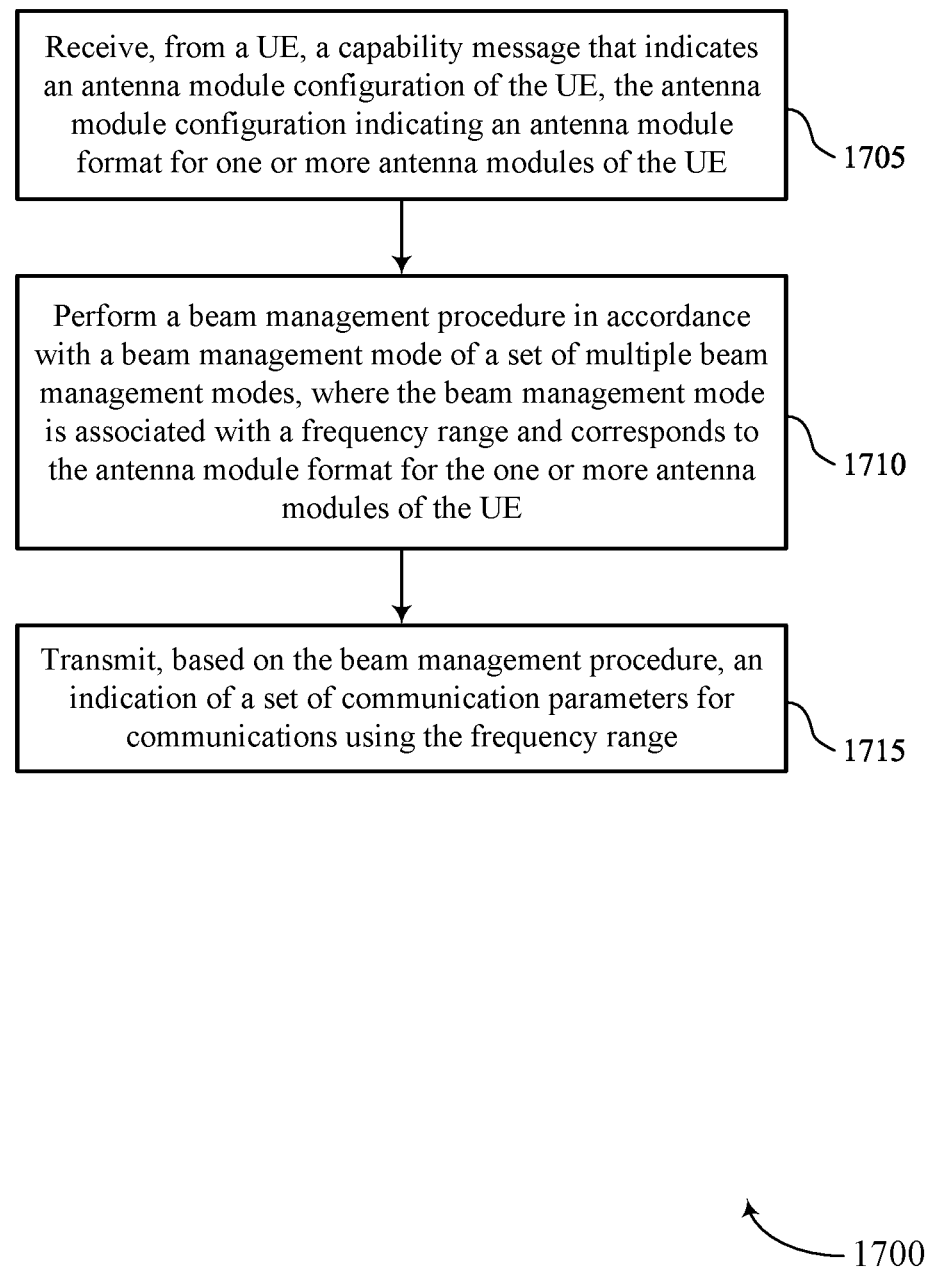

FIG. 17 illustrates a flowchart showing a method 1700 that supports beam management and frequency range limitation according to antenna module capabilities in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE, a capability message that indicates an antenna module configuration of the UE, the antenna module configuration indicating an antenna module format for one or more antenna modules of the UE. The operations of 1705 may be performed in accordance with examples as disclosed herein. In some examples, aspects of the operations of 1705 may be performed by a UE capability manager 1125 as described with reference to FIG. 11.

At 1710, the method may include performing a beam management procedure in accordance with a beam management mode of a set of multiple beam management modes, where the beam management mode is associated with a frequency range and corresponds to the antenna module format for the one or more antenna modules of the UE. The operations of 1710 may be performed in accordance with examples as disclosed herein. In some examples, aspects of the operations of 1710 may be performed by a beam management procedure component 1130 as described with reference to FIG. 11.

At 1715, the method may include transmitting, based on the beam management procedure, an indication of a set of communication parameters for communications using the frequency range. The operations of 1715 may be performed in accordance with examples as disclosed herein. In some examples, aspects of the operations of 1715 may be performed by a UE communication parameters component 1135 as described with reference to FIG. 11.

Figure 18:
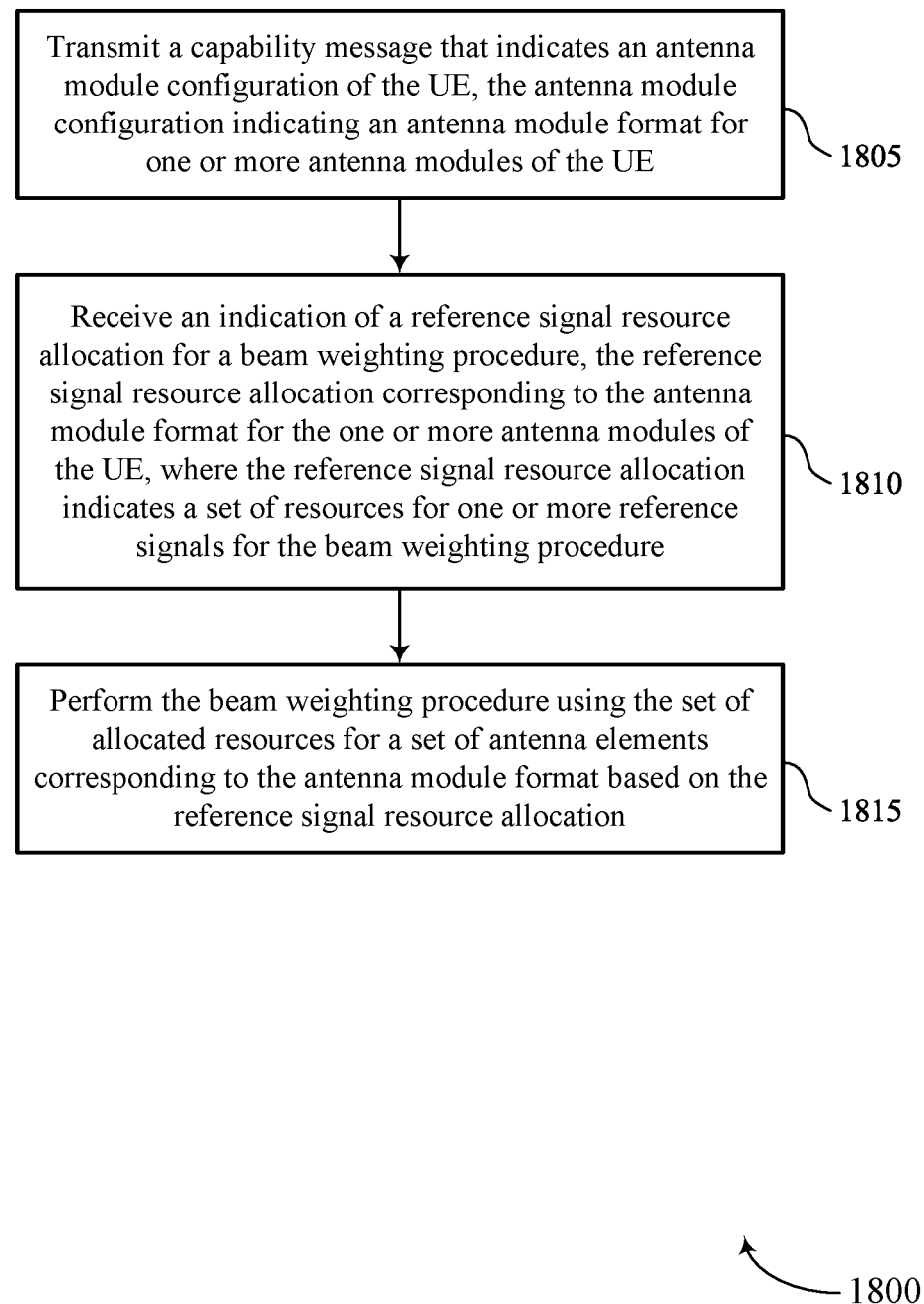

FIG. 18 illustrates a flowchart showing a method 1800 that supports beam management and frequency range limitation according to antenna module capabilities in accordance with one or more aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1805, the method may include transmitting a capability message that indicates an antenna module configuration of the UE, the antenna module configuration indicating an antenna module format for one or more antenna modules of the UE. The operations of 1805 may be performed in accordance with examples as disclosed herein. In some examples, aspects of the operations of 1805 may be performed by a capability component 725 as described with reference to FIG. 7.

At 1810, the method may include receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure. The operations of 1810 may be performed in accordance with examples as disclosed herein. In some examples, aspects of the operations of 1810 may be performed by a resource allocation component 745 as described with reference to FIG. 7.

At 1815, the method may include performing the beam weighting procedure using the set of allocated resources for a set of antenna elements corresponding to the antenna module format based on the reference signal resource allocation. The operations of 1815 may be performed in accordance with examples as disclosed herein. In some examples, aspects of the operations of 1815 may be performed by a beam weighting procedure component 750 as described with reference to FIG. 7.

Figure 19:
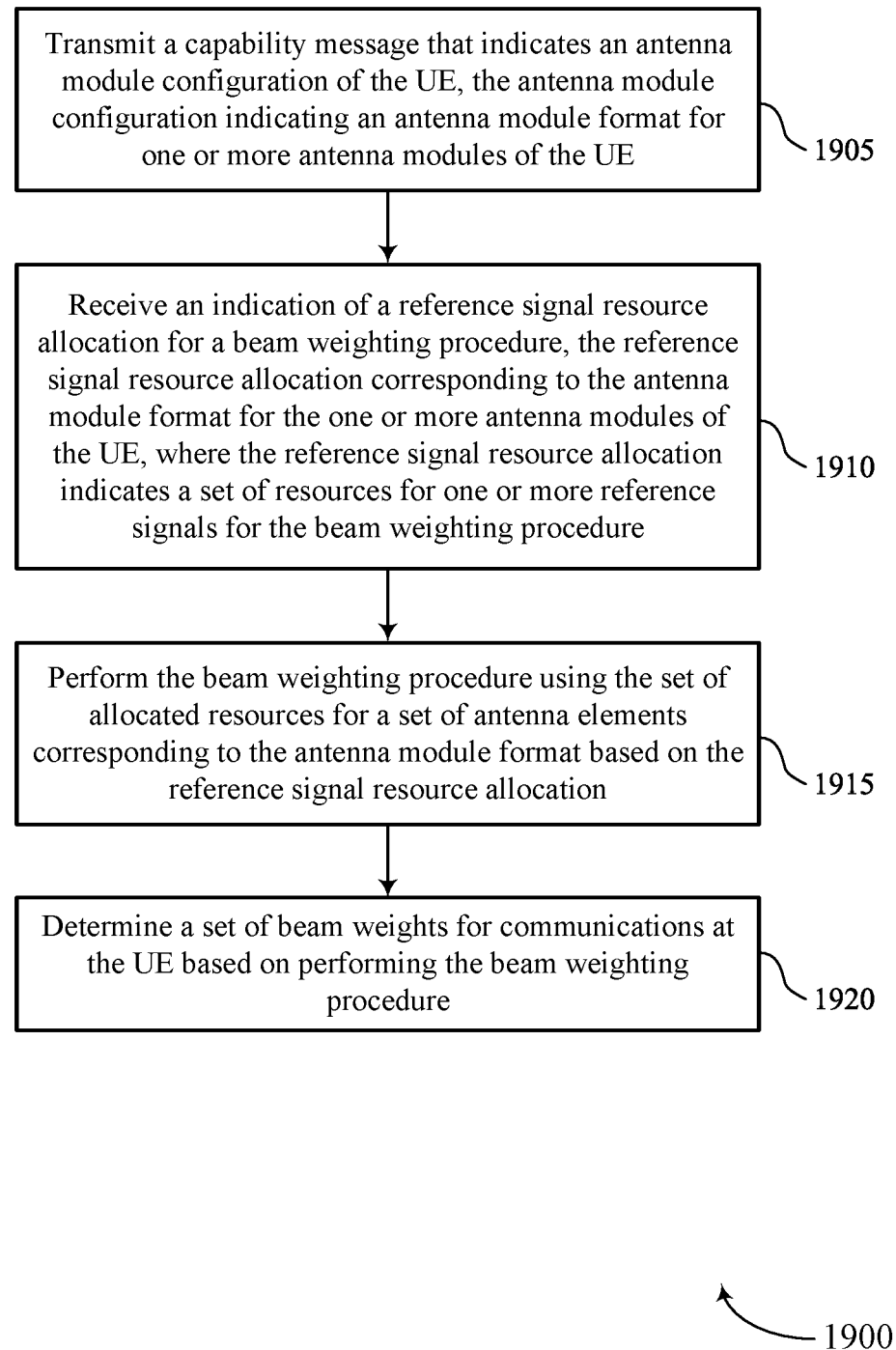

FIG. 19 illustrates a flowchart showing a method 1900 that supports beam management and frequency range limitation according to antenna module capabilities in accordance with one or more aspects of the present disclosure. The operations of the method 1900 may be implemented by a UE or its components as described herein. For example, the operations of the method 1900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1905, the method may include transmitting a capability message that indicates an antenna module configuration of the UE, the antenna module configuration indicating an antenna module format for one or more antenna modules of the UE. The operations of 1905 may be performed in accordance with examples as disclosed herein. In some examples, aspects of the operations of 1905 may be performed by a capability component 725 as described with reference to FIG. 7.

At 1910, the method may include receiving an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure. The operations of 1910 may be performed in accordance with examples as disclosed herein. In some examples, aspects of the operations of 1910 may be performed by a resource allocation component 745 as described with reference to FIG. 7.

At 1915, the method may include performing the beam weighting procedure using the set of allocated resources for a set of antenna elements corresponding to the antenna module format based on the reference signal resource allocation. The operations of 1915 may be performed in accordance with examples as disclosed herein. In some examples, aspects of the operations of 1915 may be performed by a beam weighting procedure component 750 as described with reference to FIG. 7.

At 1920, the method may include determining a set of beam weights for communications at the UE based on performing the beam weighting procedure. The operations of 1920 may be performed in accordance with examples as disclosed herein. In some examples, aspects of the operations of 1920 may be performed by a beam weighting procedure component 750 as described with reference to FIG. 7.

Figure 20:
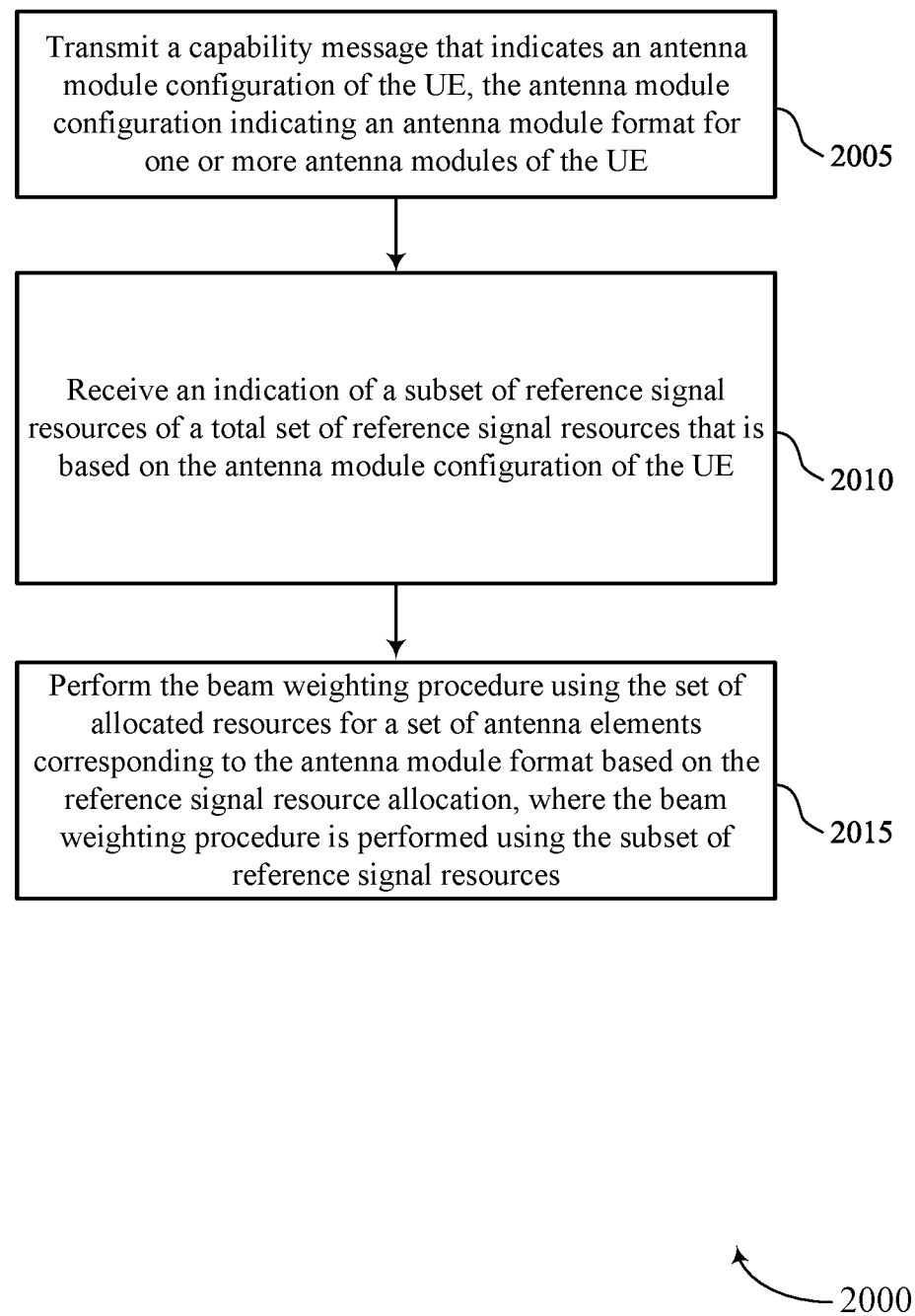

FIG. 20 illustrates a flowchart showing a method 2000 that supports beam management and frequency range limitation according to antenna module capabilities in accordance with one or more aspects of the present disclosure. The operations of the method 2000 may be implemented by a UE or its components as described herein. For example, the operations of the method 2000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 2005, the method may include transmitting a capability message that indicates an antenna module configuration of the UE, the antenna module configuration indicating an antenna module format for one or more antenna modules of the UE. The operations of 2005 may be performed in accordance with examples as disclosed herein. In some examples, aspects of the operations of 2005 may be performed by a capability component 725 as described with reference to FIG. 7.

At 2010, the method may include receiving an indication of a subset of reference signal resources of a total set of reference signal resources that is based on the antenna module configuration of the UE. The operations of 2010 may be performed in accordance with examples as disclosed herein. In some examples, aspects of the operations of 2010 may be performed by a resource allocation component 745 as described with reference to FIG. 7.

At 2015, the method may include performing the beam weighting procedure using the set of allocated resources for a set of antenna elements corresponding to the antenna module format based on the reference signal resource allocation, where the beam weighting procedure is performed using the subset of reference signal resources. The operations of 2015 may be performed in accordance with examples as disclosed herein. In some examples, aspects of the operations of 2015 may be performed by a beam weighting procedure component 750 as described with reference to FIG. 7.

At 2020, the method may include receiving an indication of a subset of reference signal resources of a total set of reference signal resources that is based on the antenna module configuration of the UE, where the beam weighting procedure is performed using the subset of reference signal resources. The operations of 2020 may be performed in accordance with examples as disclosed herein. In some examples, aspects of the operations of 2020 may be performed by a resource allocation component 745 as described with reference to FIG. 7.

Figure 21:
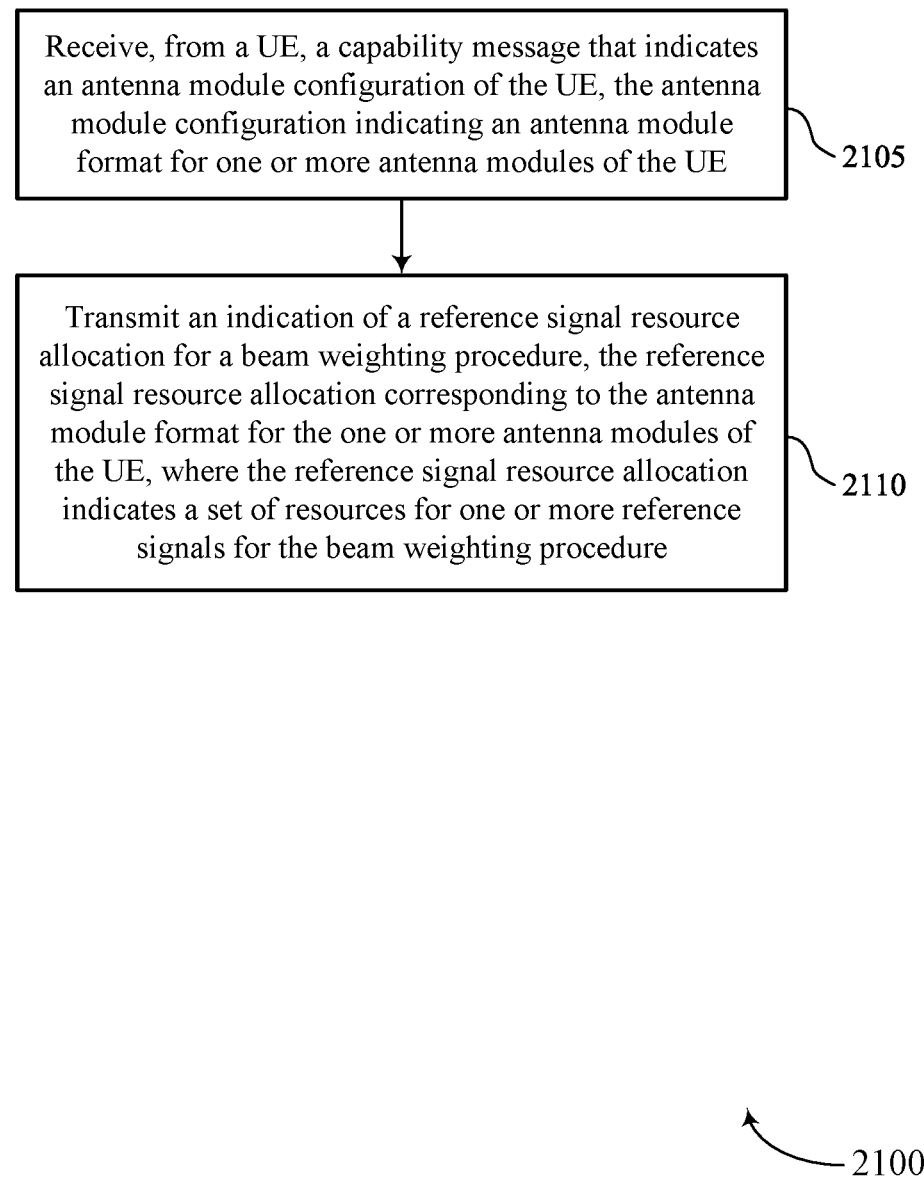

FIG. 21 illustrates a flowchart showing a method 2100 that supports beam management and frequency range limitation according to antenna module capabilities in accordance with one or more aspects of the present disclosure. The operations of the method 2100 may be implemented by a network entity or its components as described herein. For example, the operations of the method 2100 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 2105, the method may include receiving, from a UE, a capability message that indicates an antenna module configuration of the UE, the antenna module configuration indicating an antenna module format for one or more antenna modules of the UE. The operations of 2105 may be performed in accordance with examples as disclosed herein. In some examples, aspects of the operations of 2105 may be performed by a UE capability manager 1125 as described with reference to FIG. 11.

At 2110, the method may include transmitting an indication of a reference signal resource allocation for a beam weighting procedure, the reference signal resource allocation corresponding to the antenna module format for the one or more antenna modules of the UE, where the reference signal resource allocation indicates a set of resources for one or more reference signals for the beam weighting procedure. The operations of 2110 may be performed in accordance with examples as disclosed herein. In some examples, aspects of the operations of 2110 may be performed by a reference signal resource allocation component 1140 as described with reference to FIG. 11.

The following provides an overview of aspects of the present disclosure:

Aspect 1: A method for wireless communications, at a UE, comprising: transmitting a capability message that indicates an antenna module configuration of the UE, the antenna module configuration indicating an antenna module format for one or more antenna modules of the UE; performing a beam management procedure in accordance with a beam management mode of a plurality of beam management modes, wherein the beam management mode is associated with a frequency range and corresponds to the antenna module format for the one or more antenna modules of the UE; receiving, based at least in part on the beam management procedure, an indication of a set of communication parameters for communications using the frequency range; and communicating, based at least in part on the set of communication parameters, one or more messages using the frequency range and the one or more antenna modules of the UE.

Aspect 2: The method of aspect 1, wherein transmitting the capability message comprises: transmitting an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

Aspect 3: The method of any of aspects 1 through 2, wherein performing the beam management procedure comprises: performing the beam management procedure in accordance with a common beam management mode associated with a first frequency range that is smaller than a frequency range capability of the UE.

Aspect 4: The method of any of aspects 1 through 2, further comprising: receiving an indication for the UE to switch from a common beam management mode to an independent beam management mode based at least in part on the antenna module configuration.

Aspect 5: The method of aspect 4, wherein performing the beam management procedure comprises: performing the beam management procedure in accordance with the independent beam management mode, wherein the independent beam management mode is associated with a second frequency range that is larger than the frequency range.

Aspect 6: The method of any of aspects 1 through 5, wherein the frequency range is based at least in part on a beamforming capability of the UE in the frequency range.

Aspect 7: The method of any of aspects 1 through 6, wherein the indication of the set of communication parameters comprises a subcarrier spacing for the communications based at least in part on the antenna module configuration and the frequency range.

Aspect 8: The method of any of aspects 1 through 7, wherein the indication of the set of communication parameters comprises an indication for the UE to use a subset of the frequency range or the frequency range for the communications based at least in part on the antenna module configuration and the beam management mode.

Aspect 9: The method of aspect 8, wherein communicating the one or more messages comprises: communicating, based at least in part on the set of communication parameters, the one or more messages using a first set of beam weights corresponding to the subset of the frequency range; or communicating, based at least in part on the set of communication parameters, the one or more messages using a second set of beam weights corresponding to the frequency range.

Aspect 10: The method of any of aspects 8 through 9, wherein the subset of the frequency range is indicated based at least in part on a carrier frequency offset associated with the subset of the frequency range.

Aspect 11: A method for wireless communications, at a network entity, comprising: receiving, from a UE, a capability message that indicates an antenna module configuration of the UE, the antenna module configuration indicating an antenna module format for one or more antenna modules of the UE; performing a beam management procedure in accordance with a beam management mode of a plurality of beam management modes, wherein the beam management mode is associated with a frequency range and corresponds to the antenna module format for the one or more antenna modules of the UE; and transmitting, based at least in part on the beam management procedure, an indication of a set of communication parameters for communications using the frequency range.

Aspect 12: The method of aspect 11, wherein receiving the capability message comprises: receiving an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

Aspect 13: The method of any of aspects 11 through 12, wherein performing the beam management procedure comprises: performing the beam management procedure in accordance with a common beam management mode associated with a first frequency range that is smaller than a frequency range capability of the UE.

Aspect 14: The method of any of aspects 11 through 12, further comprising: transmitting an indication for the UE to switch from a common beam management mode to an independent beam management mode based at least in part on the antenna module configuration.

Aspect 15: The method of aspect 14, wherein performing the beam management procedure comprises: performing the beam management procedure in accordance with the independent beam management mode, wherein the independent beam management mode is associated with a second frequency range that is larger than the frequency range.

Aspect 16: The method of any of aspects 11 through 15, wherein the frequency range is based at least in part on a beam forming capability of the UE in the frequency range.

Aspect 17: The method of any of aspects 11 through 16, wherein the indication of the set of communication parameters comprises a subcarrier spacing for the communications based at least in part on the antenna module configuration and the frequency range.

Aspect 18: The method of any of aspects 11 through 17, wherein the indication of the set of communication parameters comprises an indication for the UE to use a subset of the frequency range or the frequency range for the communications based at least in part on the antenna module configuration and the beam management mode.

Aspect 19: The method of aspect 18, wherein the indication of the set of communication parameters comprises: a first set of beam weights corresponding to the subset of the frequency range; or a second set of beam weights corresponding to the frequency range.

Aspect 20: The method of any of aspects 18 through 19, wherein the subset of the frequency range is indicated based at least in part on a carrier frequency offset associated with the subset of the frequency range.

Aspect 21: A method for wireless communications, at a UE, comprising: transmitting a capability message that indicates an antenna module configuration of the UE, the antenna module configuration indicating an antenna module format for one or more antenna modules of the UE; receiving an indication of a reference signal resource allocation for a beam weighting procedure, the reference signal resource allocation corresponding to the antenna module format for the one or more antenna modules of the UE, wherein the reference signal resource allocation indicates a set of resources for one or more reference signals for the beam weighting procedure; and performing the beam weighting procedure using the set of allocated resources for a set of antenna elements corresponding to the antenna module format based at least in part on the reference signal resource allocation.

Aspect 22: The method of aspect 21, wherein transmitting the capability message comprises: transmitting an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

Aspect 23: The method of any of aspects 21 through 22, further comprising: determining a set of beam weights for communications at the UE based at least in part on performing the beam weighting procedure.

Aspect 24: The method of any of aspects 21 through 23, wherein receiving the indication of the reference signal resource allocation comprises: receiving an indication of a subset of reference signal resources of a total set of reference signal resources that is based at least in part on the antenna module configuration of the UE, wherein the beam weighting procedure is performed using the subset of reference signal resources.

Aspect 25: The method of aspect 24, wherein the total set of reference signal resources is a function of a quantity of antenna elements in the antenna module format.

Aspect 26: A method for wireless communications, at a network entity, comprising: receiving, from a UE, a capability message that indicates an antenna module configuration of the UE, the antenna module configuration indicating an antenna module format for one or more antenna modules of the UE; and transmitting an indication of a reference signal resource allocation for a beam weighting procedure, the reference signal resource allocation corresponding to the antenna module format for the one or more antenna modules of the UE, wherein the reference signal resource allocation indicates a set of resources for one or more reference signals for the beam weighting procedure.

Aspect 27: The method of aspect 26, wherein receiving the capability message comprises: receiving an indication of a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof.

Aspect 28: The method of any of aspects 26 through 27, wherein transmitting the indication of the reference signal resource allocation comprises: transmitting an indication of a subset of reference signal resources of a total set of reference signal resources that is based at least in part on the antenna module configuration of the UE, wherein the subset of reference signal resources is for a beam weighting procedure.

Aspect 29: The method of aspect 28, wherein the total set of reference signal resources is a function of a quantity of antenna elements in the antenna module format.

Aspect 30: An apparatus for wireless communications, comprising a processor; memory coupled with the processor; and instructions stored in the memory and executable by the processor to cause the apparatus to perform a method of any of aspects 1 through 10.

Aspect 31: An apparatus for wireless communications, comprising at least one means for performing a method of any of aspects 1 through 10.

Aspect 32: A non-transitory computer-readable medium storing code for wireless communications, the code comprising instructions executable by a processor to perform a method of any of aspects 1 through 10.

Aspect 33: An apparatus for wireless communications, comprising a processor; memory coupled with the processor; and instructions stored in the memory and executable by the processor to cause the apparatus to perform a method of any of aspects 11 through 20.

Aspect 34: An apparatus for wireless communications, comprising at least one means for performing a method of any of aspects 11 through 20.

Aspect 35: A non-transitory computer-readable medium storing code for wireless communications, the code comprising instructions executable by a processor to perform a method of any of aspects 11 through 20.

Aspect 36: An apparatus for wireless communications, comprising a processor; memory coupled with the processor; and instructions stored in the memory and executable by the processor to cause the apparatus to perform a method of any of aspects 21 through 25.

Aspect 37: An apparatus for wireless communications, comprising at least one means for performing a method of any of aspects 21 through 25.

Aspect 38: A non-transitory computer-readable medium storing code for wireless communications, the code comprising instructions executable by a processor to perform a method of any of aspects 21 through 25.

Aspect 39: An apparatus for wireless communications, comprising a processor; memory coupled with the processor; and instructions stored in the memory and executable by the processor to cause the apparatus to perform a method of any of aspects 26 through 29.

Aspect 40: An apparatus for wireless communications, comprising at least one means for performing a method of any of aspects 26 through 29.

Aspect 41: A non-transitory computer-readable medium storing code for wireless communications, the code comprising instructions executable by a processor to perform a method of any of aspects 26 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more memories storing processor-executable code; and
   one or more processors coupled with the one or more memories and individually or collectively operable to execute the code to cause the UE to:
      transmit a capability message that indicates an antenna module configuration of the UE, the antenna module configuration indicating an antenna module format for one or more antenna modules of the UE, wherein the antenna module format comprises a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof;
      perform a beam management procedure in accordance with a beam management mode of a plurality of beam management modes, wherein the beam management mode is associated with a frequency range and corresponds to the antenna module format for the one or more antenna modules of the UE;
      receive, based at least in part on the beam management procedure, an indication of a set of communication parameters for communications using the frequency range; and
      communicate, based at least in part on the set of communication parameters, one or more messages using the frequency range and the one or more antenna modules of the UE.

2. The apparatus of claim 1, wherein to perform the beam management procedure the one or more processors are individually or collectively operable to execute the code to cause the UE to:
   perform the beam management procedure in accordance with a common beam management mode associated with a first frequency range that is smaller than a frequency range capability of the UE.

3. The apparatus of claim 1, wherein the one or more processors are individually or collectively operable to execute the code to cause the UE to:
   receive an indication for the UE to switch from a common beam management mode to an independent beam management mode based at least in part on the antenna module configuration.

4. The apparatus of claim 3, wherein to perform the beam management procedure the one or more processors are individually or collectively operable to execute the code to cause the UE to:
   perform the beam management procedure in accordance with the independent beam management mode, wherein the independent beam management mode is associated with a second frequency range that is larger than the frequency range.

5. The apparatus of claim 1, wherein the frequency range is based at least in part on a beamforming capability of the UE in the frequency range.

6. The apparatus of claim 1, wherein the indication of the set of communication parameters comprises a subcarrier spacing for the communications based at least in part on the antenna module configuration and the frequency range.

7. The apparatus of claim 1, wherein the indication of the set of communication parameters comprises an indication for the UE to use a subset of the frequency range or the frequency range for the communications based at least in part on the antenna module configuration and the beam management mode.

8. The apparatus of claim 7, wherein to communicate the one or more messages the one or more processors are individually or collectively operable to execute the code to cause the UE to:
   communicate, based at least in part on the set of communication parameters, the one or more messages using a first set of beam weights corresponding to the subset of the frequency range.

9. The apparatus of claim 7, wherein to communicate the one or more messages the one or more processors are individually or collectively operable to execute the code to cause the UE to:

communicate, based at least in part on the set of communication parameters, the one or more messages using a second set of beam weights corresponding to the frequency range.

10. The apparatus of claim 7, wherein the subset of the frequency range is indicated based at least in part on a carrier frequency offset associated with the subset of the frequency range.

11. An apparatus for wireless communications, comprising:
one or more memories storing processor-executable code; and
one or more processors coupled with the one or more memories and individually or collectively operable to execute the code to cause the apparatus to:
receive, from a user equipment (UE), a capability message that indicates an antenna module configuration of the UE, the antenna module configuration indicating an antenna module format for one or more antenna modules of the UE, wherein the antenna module format comprises a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof;
perform a beam management procedure in accordance with a beam management mode of a plurality of beam management modes, wherein the beam management mode is associated with a frequency range and corresponds to the antenna module format for the one or more antenna modules of the UE; and
transmit, based at least in part on the beam management procedure, an indication of a set of communication parameters for communications using the frequency range.

12. The apparatus of claim 11, wherein to perform the beam management procedure the one or more processors are individually or collectively operable to execute the code to cause the apparatus to:
perform the beam management procedure in accordance with a common beam management mode associated with a first frequency range that is smaller than a frequency range capability of the UE.

13. The apparatus of claim 11, wherein the one or more processors are individually or collectively operable to execute the code to cause the apparatus to:
transmit an indication for the UE to switch from a common beam management mode to an independent beam management mode based at least in part on the antenna module configuration.

14. The apparatus of claim 13, wherein to perform the beam management procedure the one or more processors are individually or collectively operable to execute the code to cause the apparatus to:
perform the beam management procedure in accordance with the independent beam management mode, wherein the independent beam management mode is associated with a second frequency range that is larger than the frequency range.

15. The apparatus of claim 11, wherein the frequency range is based at least in part on a beamforming capability of the UE in the frequency range.

16. The apparatus of claim 11, wherein the indication of the set of communication parameters comprises a subcarrier spacing for the communications based at least in part on the antenna module configuration and the frequency range.

17. The apparatus of claim 11, wherein the indication of the set of communication parameters comprises an indication for the UE to use a subset of the frequency range or the frequency range for the communications based at least in part on the antenna module configuration and the beam management mode.

18. The apparatus of claim 17, wherein the indication of the set of communication parameters comprises:
a first set of beam weights corresponding to the subset of the frequency range; or
a second set of beam weights corresponding to the frequency range.

19. The apparatus of claim 17, wherein the subset of the frequency range is indicated based at least in part on a carrier frequency offset associated with the subset of the frequency range.

20. An apparatus for wireless communications at a user equipment (UE), comprising:
one or more memories storing processor-executable code; and
one or more processors coupled with the one or more memories and individually or collectively operable to execute the code to cause the UE to:
transmit a capability message that indicates an antenna module configuration of the UE, the antenna module configuration indicating an antenna module format for one or more antenna modules of the UE, wherein the antenna module format comprises a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof;
receive an indication of a reference signal resource allocation for a beam weighting procedure, the reference signal resource allocation corresponding to the antenna module format for the one or more antenna modules of the UE, wherein the reference signal resource allocation indicates a set of resources for one or more reference signals for the beam weighting procedure; and
perform the beam weighting procedure using the set of allocated resources for a set of antenna elements corresponding to the antenna module format based at least in part on the reference signal resource allocation.

21. The apparatus of claim 20, wherein the one or more processors are individually or collectively operable to execute the code to cause the UE to:
determine a set of beam weights for communications at the UE based at least in part on performing the beam weighting procedure.

22. The apparatus of claim 20, wherein to receive the indication of the reference signal resource allocation the one or more processors are individually or collectively operable to execute the code to cause the UE to:
receive an indication of a subset of reference signal resources of a total set of reference signal resources that is based at least in part on the antenna module configuration of the UE, wherein the beam weighting procedure is performed using the subset of reference signal resources.

23. The apparatus of claim 22, wherein the total set of reference signal resources is a function of a quantity of antenna elements in the antenna module format.

24. An apparatus for wireless communications, comprising:
 one or more memories storing processor-executable code; and
 one or more processors coupled with the one or more memories and individually or collectively operable to execute the code to cause the apparatus to:
  receive, from a user equipment (UE), a capability message that indicates an antenna module configuration of the UE, the antenna module configuration indicating an antenna module format for one or more antenna modules of the UE, wherein the antenna module format comprises a quantity of antenna modules of the UE, a dimensionality of a set of antenna elements of the one or more antenna modules of the UE, a geometric shape of the one or more antenna modules of the UE, a positioning of the one or more antenna modules relative to the UE, a location of the one or more antenna modules relative to the UE, or any combination thereof; and
  transmit an indication of a reference signal resource allocation for a beam weighting procedure, the reference signal resource allocation corresponding to the antenna module format for the one or more antenna modules of the UE, wherein the reference signal resource allocation indicates a set of resources for one or more reference signals for the beam weighting procedure.

25. The apparatus of claim 24, wherein to transmit the indication of the reference signal resource allocation the one or more processors are individually or collectively operable to execute the code to cause the apparatus to:
 transmit an indication of a subset of reference signal resources of a total set of reference signal resources that is based at least in part on the antenna module configuration of the UE, wherein the subset of reference signal resources is for the beam weighting procedure.

26. The apparatus of claim 25, wherein the total set of reference signal resources is a function of a quantity of antenna elements in the antenna module format.

\* \* \* \* \*